United States Patent
Bennett

(10) Patent No.: US 7,336,620 B2
(45) Date of Patent: Feb. 26, 2008

(54) METHOD FOR ENABLING INITIATION OF TESTING OF NETWORK USING IP MEASUREMENT PROTOCOL PACKETS

(75) Inventor: Jon Claude Russell Bennett, Sudbury, MA (US)

(73) Assignee: General Instrument Corporation, Horsham, PA (US)

( * ) Notice: Subject to any disclaimer, the term of this patent is extended or adjusted under 35 U.S.C. 154(b) by 892 days.

(21) Appl. No.: 10/648,690

(22) Filed: Aug. 25, 2003

(65) Prior Publication Data

US 2004/0095930 A1 May 20, 2004

Related U.S. Application Data

(60) Provisional application No. 60/421,303, filed on Oct. 25, 2002.

(51) Int. Cl.
*H04L 12/26* (2006.01)
*H04L 12/28* (2006.01)

(52) U.S. Cl. ..................... 370/252; 370/389

(58) Field of Classification Search ............... None
See application file for complete search history.

(56) References Cited

U.S. PATENT DOCUMENTS 6,507,562 B1 * 1/2003 Kadansky et al. .......... 370/216
6,978,223 B2 * 12/2005 Milliken ..................... 702/182
2005/0089016 A1 * 4/2005 Zhang et al. ............... 370/351

OTHER PUBLICATIONS

McGregor, IPMP draft-mcgregor-ipmp-00.txt, Feb. 2002.*

* cited by examiner

*Primary Examiner*—Huy D. Vu
*Assistant Examiner*—Clemence Han
(74) *Attorney, Agent, or Firm*—Larry T. Cullen

(57) ABSTRACT

The practice and need for active network measurement is well established, however, current tools are not well suited to this task, mostly because the protocols which they employ have not been designed for measurement of the modern Internet. The IP Measurement Protocol (IPMP) is based on packet-probes, and is designed to allow routers to participate in measurements by the insertion of path information as the probe passes between a pair of hosts.

20 Claims, 12 Drawing Sheets

METHOD FOR ENABLING INITIATION OF TESTING OF NETWORK USING IP MEASUREMENT PROTOCOL PACKETS

STATEMENT OF RELATED APPLICATIONS

This application claims the benefit of priority to U.S. Provisional Patent Application No. 60/421,303, filed Oct. 25, 2002, entitled "IP Measurement Protocol."

This application is also related to copending U.S. patent application Ser. No. 10/648,552, entitled "Method For Monitoring Performance Of Network Using IP Measurement Protocol Packets," filed concurrently herewith by the same inventor and assigned to the same assignee, which application is hereby incorporated by reference as if repeated herein in its entirety, including the drawings.

This application is also related to copending U.S. patent application Ser. No. 10/648,622, entitled "Method For Performing Remote Testing Of Network Using IP Measurement Protocol Packets," filed concurrently herewith by the same inventor and assigned to the same assignee, which application is hereby incorporated by reference as if repeated herein in its entirety, including the drawings.

This application is also related to copending U.S. patent application Ser. No. 10/648,724, entitled "Method And Apparatus For Testing An IP Network," filed concurrently herewith by same inventor and assigned to the same assignee, which application is hereby incorporated by reference as if repeated herein in its entirety, including the drawings.

This application is also related to copending U.S. patent application Ser. No. 10/648,682, entitled "Method For Converting An IP Measurement Protocol To A Data Packet," filed concurrently herewith by the same inventor and assigned to the same assignee, which application is hereby incorporated by reference as if repeated herein in its entirety, including the drawings.

This application is also related to copending U.S. patent application Ser. No. 10/648,549, entitled "Method For Enabling Non-Predetermined Testing Of Network Using IP Measurement Protocol Packets," filed concurrently herewith by the same inventor and assigned to the same assignee, which application is hereby incorporated by reference as if repeated herein in its entirety, including the drawings.

This application is also related to copending U.S. patent application Ser. No. 10/648,866 entitled "Method For Using Different Packet Type And Port Options Values In An IP Measurement Protocol Packet From Those Used To Process The Packet," filed concurrently herewith by the same inventor and assigned to the same assignee, which application is hereby incorporated by reference as if repeated herein in its entirety, including the drawings.

This application is also related to copending U.S. patent application Ser. No. 10/694,632, entitled "Use Of Synchronized Clocks To Provide Input And Output Time Stamps For Performance Measurement Of Traffic Within A Communications System," filed Oct. 27, 2003, by at least one of the same inventors and assigned to the same assignee, which application is hereby incorporated by reference as if repeated herein in its entirety, including the drawings.

FIELD OF THE INVENTION

The present invention is directed to methods and apparatuses for transmitting packet data over computer networks, and more particularly to a method and apparatus for transmitting packet data over a public computer network using Internet Protocol, as well as monitoring and testing these computer networks.

BACKGROUND

A previous method for sending test packets over a computer network was mostly designed for use in an academic setting. As such, this method did not provide for centralized monitoring and did not provide mechanisms to support use in a commercial environment. An Existing Internet Protocol Measurement Protocol (IPMP) involved having hosts and routers place timestamps in packets as they were forwarded, but did not provide a sufficiently rich set of methods for controlling the recording of timestamps or for providing information about the timestamps that would be needed in a commercial network.

The present invention is therefore directed to the problem of developing a method and apparatus for enabling routers and other network devices to provide measurement information to permit proper characterization of a computer network.

SUMMARY OF THE INVENTION

The present invention solves these and other problems by providing inter alia a method for monitoring propagation delays and other properties of paths in Internet Protocol (IP) networks. One embodiment of this method includes an Internet Protocol Measurement Protocol (IPMP) as augmented and revised herein.

One exemplary embodiment of the IP Measurement Protocol (IPMP) of the present invention provides several powerful capabilities, including:

1. Redirection capability, which provides the capability to send a packet from a central location to a second host, and have that second host re-direct or transmit a measurement packet to a third host, receive the reply packet and forward the result to the first host.

2. A Start Time to Live capability, which prevents measurements from being taken until the Time to Live (TTL) counter reaches a certain value, which allows for measurement of very long paths or use of very short packets, in which it is not possible to fit all the measurement records into a single measurement packet.

3. The Information Request Proxy, which allows assignment of certain information request tasks to a third party. The original IPMP required that Information Request packets (which were used to get additional information) had to be sent to the same location that inserted the measurement records. Many ISPs might not want users talking to their routers (or some devices may not have addressable IP addresses as they share a common IP address with one or more other devices, or exist behind firewalls, etc.) so this aspect of the present invention provides for designation of an Information Proxy that can respond for such devices, and the ability to place the proxy's address along with the routers address into the timestamp.

4. Timestamp qualifying information capability in the timestamp. The present invention provides additional information about how and where the timestamp was inserted, along with information about the clock source to allow the timestamp to be used without having to make any Information Requests. This capability makes the IPMP more useful for certain applications and protocols that do not need to send extra messages to be able to use the results.

5. No timestamp mode capability, which allows for simply collecting IP addresses without timestamps, e.g., allows the IPMP to be used in place of Traceroute (http://www.freesoft.org/CIE/Topics/54.htm, http://www.nwfusion.com/archive/1999b/0712gearhead.html ) as a more efficient way of finding out of about the path between two points.

According to another aspect of the present invention, while the embodiments of the various inventions herein are described for Internet Protocol version 4 (IPv4), the embodiments of the various inventions herein are equally applicable to Internet Protocol version 6 (IPv6), which has a different format for the packet header. The same may be true for subsequent versions of Internet Protocol as well.

According to another aspect of the present invention, one embodiment of the IP Measurement Protocol provides that a regular data packet be replaced with an IPMP packet, which includes in one of the data sections extensions the data that would have been in the regular protocol packet, plus a flag that says "take this data out and process this data as if this data had been the only contents of a non-IPMP packet, where the faux ports and packet type were the real ports and packet type." As such, a router or other similar device would then process the packet accordingly.

According to still another aspect of the present invention, one embodiment of the IP Measurement Protocol provides that instead of using a different packet type, the protocol may be carried in Internet Protocol version six (IPv6) header extensions. This embodiment takes advantage of certain provisions in IPv6 for inserting optional features into "header extensions" between the header and the data portion of the packet.

According to yet another aspect of the present invention, one embodiment of an IP Measurement Protocol provides a more explicit method of requesting information from routers along a path traversed by a packet rather than a single flag that says: "give me everything." According to this embodiment, the protocol provides a larger field, or extendable field, that permits one to request particular information items explicitly.

Other aspects of the present invention will be apparent to those reviewing the following drawings in light of the specification.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

One application of the present invention is for performance measurement of traffic through the Motorola Broadband Service Router (BSR) 64000.

The present invention can be used to demonstrate to Multiple System Operators (MSOs) that BSR delivers promised Quality of Service (QoS) guarantees. MSOs can use to show to subscribers that the MSOs network has delivered promised QoS guarantees. This capability allows a hardware developer and its customers to prove they are delivering advanced services, not just making marketing claims.

Figure 12:
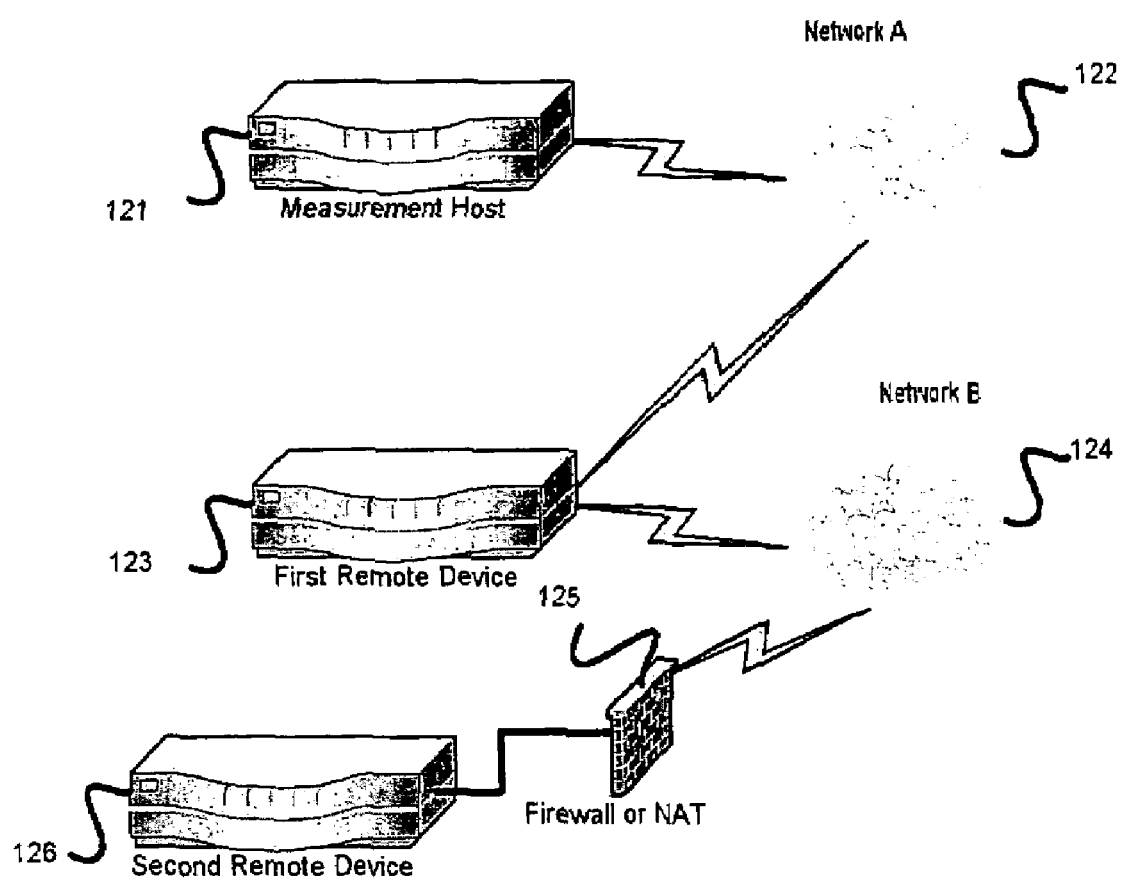
FIG. 12 shows an exemplary embodiment of an apparatus for sending and receiving Internet Protocol Measurement Protocol (IPMP) packets for measuring performance of various links in a computer network, such as a link between a first remote network device and a second remote network device, according to still another aspect of the present invention.

One additional capability includes the ability to redirect the packet multiple times, for example, to be able to send it out through a firewall and have the packet or echo come back through the firewall. FIG. 12 shows an exemplary embodiment 120 of an apparatus for sending and receiving Internet Protocol Measurement Protocol (IPMP) packets for measuring performance of various links in a computer network, such as a link between a first remote network device 123 and a second remote network device 126. The measurement host 121 sends an IPMP packet to the first remote network device 123 via network A 122. The first network device in turn sends an IPMP packet to the second remote network device 126 via network B 124. The second remote network device 126 may be behind a firewall 125 or a network address translation device.

A measurement host 121 includes at least a processor and a memory. The processor prepares the IPMP packets as described above and forwards them to remote devices over a first network 122, of which remote devices the processor is attempting to determine the performance.

Furthermore, the present invention includes a computer readable media having instructions encoded thereon to cause a network device, such as a server, router, hub, terminal, or processor to perform the methods and processes described herein.

Another additional feature adds security option fields for allowing the IPMP packets to pass through firewalls by putting in a security option that the firewall could use to authenticate the packet before allowing the packet to pass the same way that the redirecting host does.

IP Measurement Protocol (IPMP)

Introduction

The practice and need for active network measurement is well established, however, current tools are not well suited to this task, mostly because the protocols which they employ have not been designed for measurement of the modem Internet.

ICMP, for example, is widely used for measurement despite its well-known limitations for this task. These limitations include it being treated differently than other IP protocols at routers and hosts. ICMP has also received bad press from denial of service attacks and because of the number of sites generating monitoring traffic. As a consequence some ISPs disable ICMP even though this potentially causes poor performance and does not comply with RFC1009.

The protocol of the present invention operates as an echo protocol allowing packet loss, path length, route, RTT and in some cases, one-way delay measurements to be taken. Packets are generated by a measurement host and returned by an echoing router or host, known as an echoing system herein. The translation of router time stamps to real-time time stamps is supported through a separate information request and reply exchange between the measurement system and systems that insert time stamps into the echo request or reply.

Current packet probing techniques are not suited to measuring packet delay at the router level. Routers often make bad measurement targets because they are optimized for the relatively simple task of forwarding packets. Routers may process tasks that are resource intensive and therefore an opportunity for a denial of service attack at low priority or not at all. Some measurement techniques construct measurement traffic that can be difficult to efficiently detect and respond to amongst other network traffic. This type of measurement traffic precludes measuring of a router and makes the task of identifying where delay occurs in the network difficult.

Figure 6:
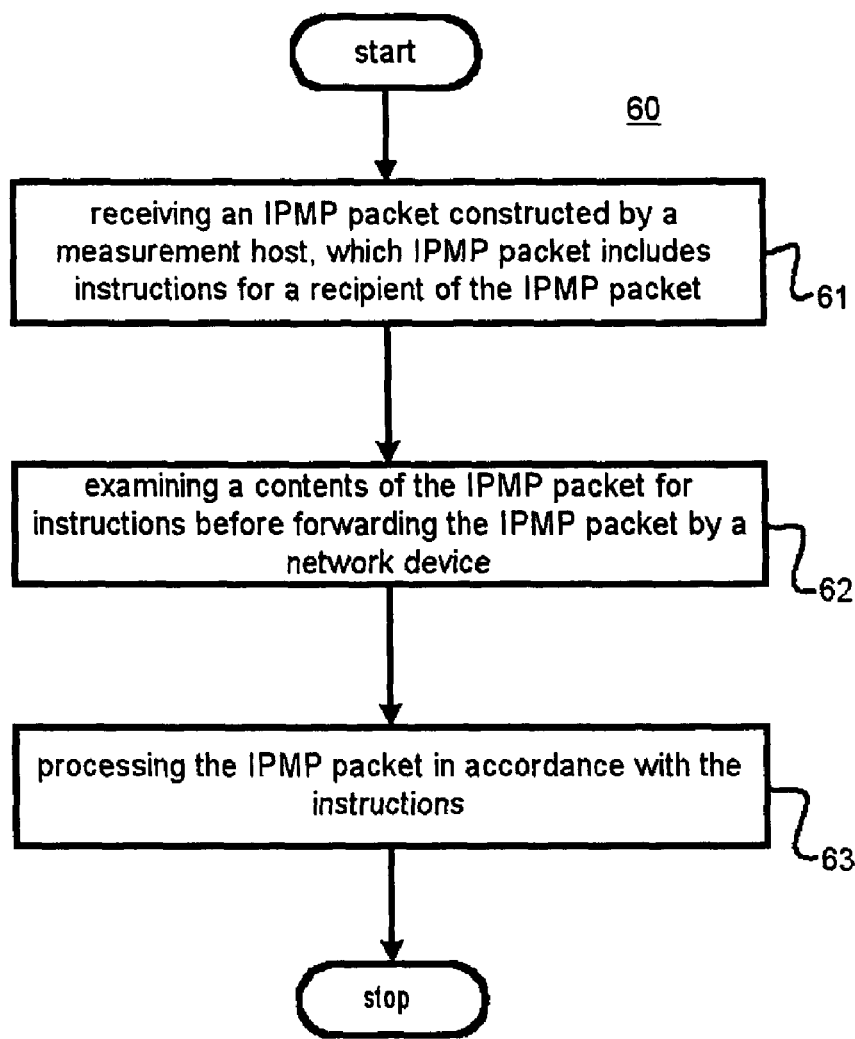
FIG. 6 shows an exemplary embodiment of a process for employing packets sent using the Internet Measurement Protocol of the present invention for measuring performance of particular links in a network according to still another aspect of the present invention.

IPMP addresses these issues by providing a measurement protocol that is tightly constrained, efficient and easy to implement. FIG. 6 shows an exemplary embodiment 60 of a process for employing packets sent using the Internet Measurement Protocol of the present invention for measuring performance of particular links in a network. Each recipient of an IPMP packet upon receiving an IPMP packet constructed by a measurement host, which IPMP packet includes instructions for a recipient of the IPMP packet (element 61) examines a contents of the IPMP packet for instructions for the recipient before forwarding the IPMP packet (element 62), and then processes the IPMP packet in accordance with the instructions, if any (element 63).

The protocol has been designed so measurement packets can be processed with about the same level of computation as IP packet forwarding. The protocol is intended to allow for easy implementation in hardware/firmware so as to provide for highly accurate measurements. It should be noted that only the TTL and Timestamp fields in the Path Records are dynamic, all the other fields are likely to be the same for all the Path Records inserted at a particular stamping location.

The IPMP has a number of options to allow it to measure a number of different properties of the links and devices on a path between two endpoints. It is intended that it should be practical to process IPMP packets in the same forwarding path as normal (non-IPMP) packets without any (significant) performance impact. To achieve this it is anticipated that a device will pre-compute all but one or two of the components of the path record and insert some combination of these components based on the options field of the packet.

The option fields of the IPMP request packet are defined with the objective of allowing a forwarding device to determine what, if any, path records should be inserted with the minimum amount of logic complexity.

Remote Measurement

There are many applications of the IP Measurement Protocol where it is sufficient to be able to perform measurements only on paths originating with the measurement host. However, there are also applications, protocols and users/operators that would be served by being able to measure the properties along paths that originate at hosts other than their own.

Some straightforward examples of such non-local measurement would be ISP operators wishing to monitor their customer's link quality to be able to demonstrate they have provided an agreed upon level of service. While the same customer may wish to have a third party organization perform the same monitoring to provide the customer with the same assurances, particularly if their traffic crosses multiple provider networks.

An example of an application/protocol use for non-local monitoring might be client copy multicast trees. The source of the multicast tree could measure path properties not only between the source and the receivers but also from receiver to receiver and reform the tree based on the measured properties of the paths between the different receivers.

To avoid hosts having to run many different client/server processes for each different entity that wishes to perform remote measurement, and to provide a common security framework IPMP provides a mechanism to support a remote measurement function.

To make it possible to perform measurements, from a remote location, of paths that do not start or end at that location, the IPMP provides a mechanism for allowing redirection of the IPMP packet. This mechanism provides hooks to support methods for authenticating IPMP packets to prevent the unauthorized use of the redirection function.

Figure 7:
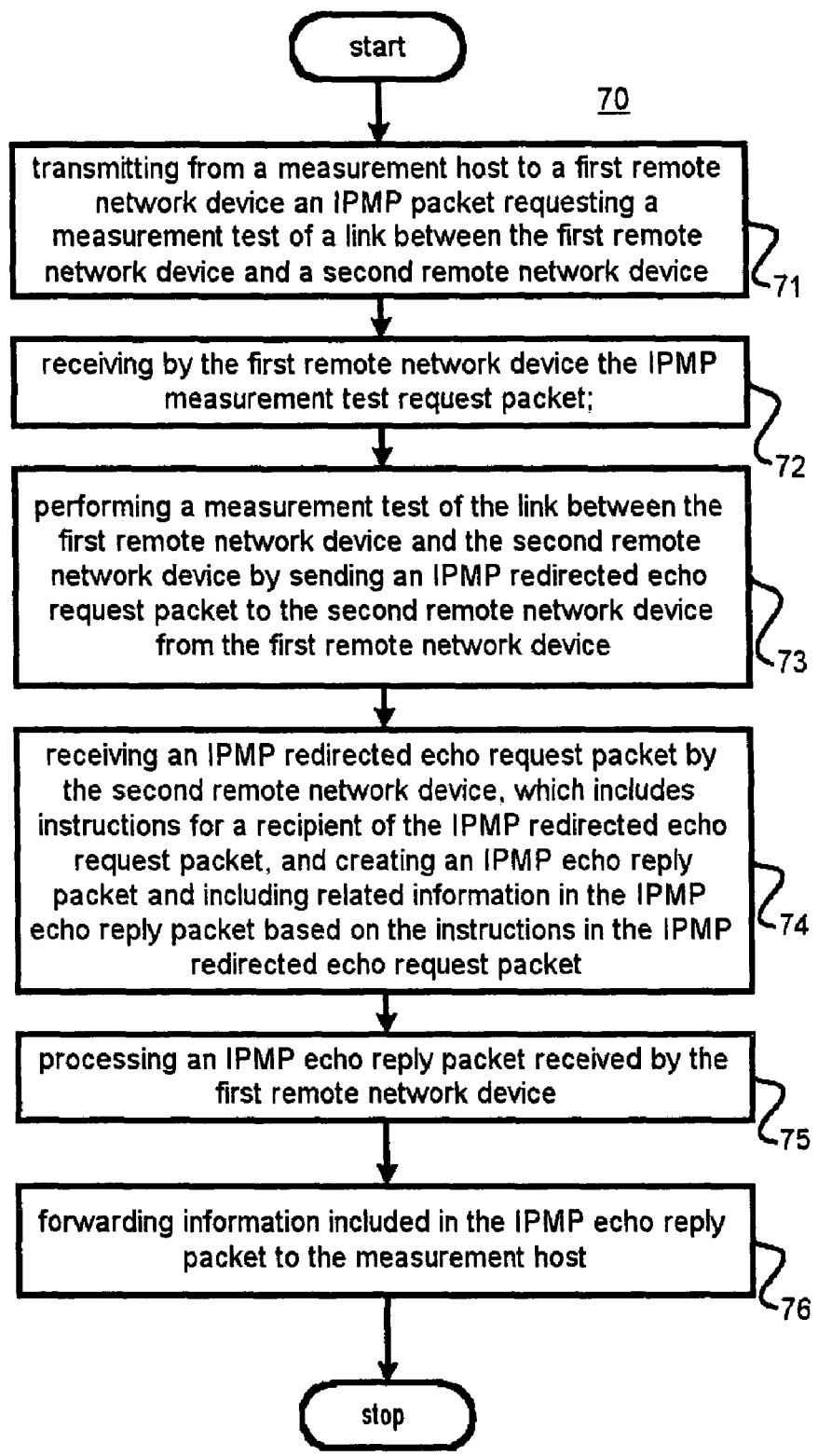
FIG. 7 shows an exemplary embodiment of a method for performing a remote test of a link between a first remote network device and a second remote network device by a measurement host according to still another aspect of the present invention.

FIG. 7 shows an exemplary embodiment of a method 70 for performing a remote test of a link between a first remote network device and a second remote network device by a measurement host. The measurement host begins the test by transmitting to a first remote network device an IPMP packet requesting a measurement test of a link between the first remote network device and a second remote network device (element 71). This request may be in the form of a redirected echo request. The first remote network device actually performs the desired test upon receiving the IPMP measurement test request packet (element 72) by sending an IPMP redirected echo request packet to the second remote network device from the first remote network device (element 73). Upon receiving the IPMP redirected echo request packet by the second remote network device, which IPMP echo redirected request packet includes instructions for a recipient of the IPMP redirected echo request packet, the second remote network device creates an IPMP echo reply packet and includes related information in the IPMP echo reply packet based on the instructions in the IPMP redirected echo request packet (element 74). Upon receiving the IPMP echo reply packet, the first remote network device processes the IPMP echo reply packet (element 75) and forwards information included in the IPMP echo reply packet to the measurement host (element 76).

Figure 8:
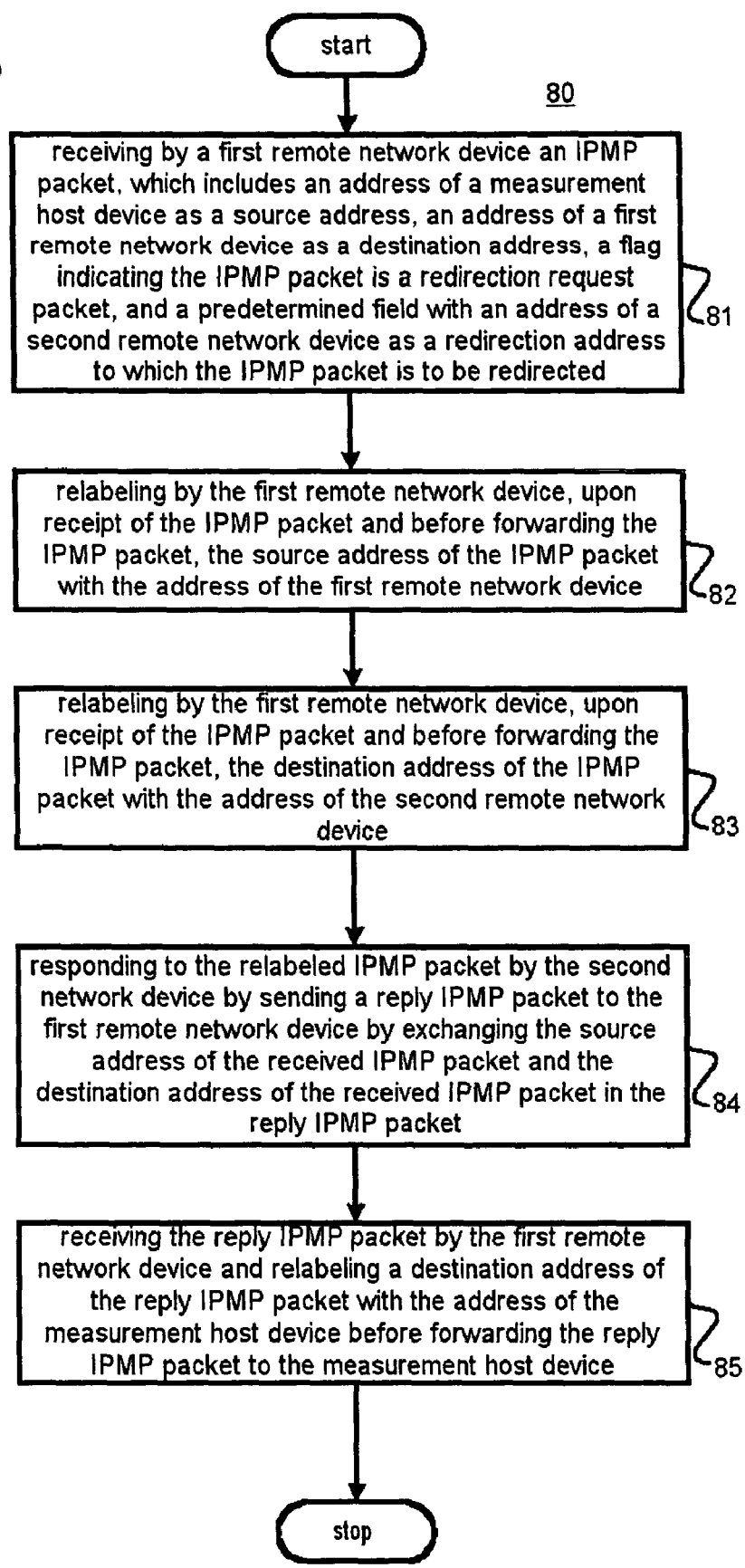
FIG. 8 shows another exemplary embodiment of a method for performing a remote test of a link between two remote network devices from a measurement host device according to yet another aspect of the present invention.

FIG. 8 shows another exemplary embodiment 80 of a method for performing a remote test of a link between two remote network devices from a measurement host device. Upon receiving by a first remote network device an IPMP packet, which includes an address of a measurement host device as a source address, an address of a first remote network device as a destination address, a flag indicating the IPMP packet is a redirection request packet, and a predetermined field with an address of a second remote network device as a redirection address to which the IPMP packet is to be redirected (element 81), the first remote network device begins by relabeling the source address of the IPMP packet with the address of the first remote network device before forwarding the IPMP packet (element 82). In addition, the first remote network device relabels the destination address of the IPMP packet with the address of the second remote network device before forwarding the IPMP packet (element 83). The second network device begins by responding to the relabeled IPMP packet by sending a reply IPMP packet to the first remote network device by exchanging the source address of the received IPMP packet and the destination address of the received IPMP packet in the reply IPMP packet (element 84). Upon receiving the reply IPMP packet by the first remote network device, the first remote network device re-labels a destination address of the reply IPMP packet with the address of the measurement host device before forwarding the reply IPMP packet to the measurement host device (element 85).

Packet formats

IPMP Echo Request and Echo Reply Packets

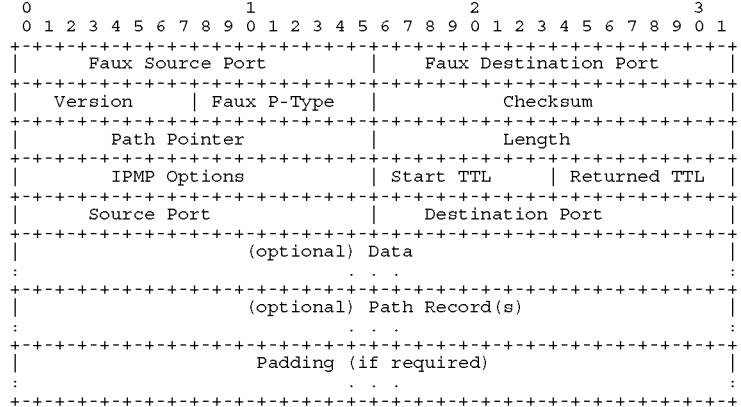

Optional Data Section Formats

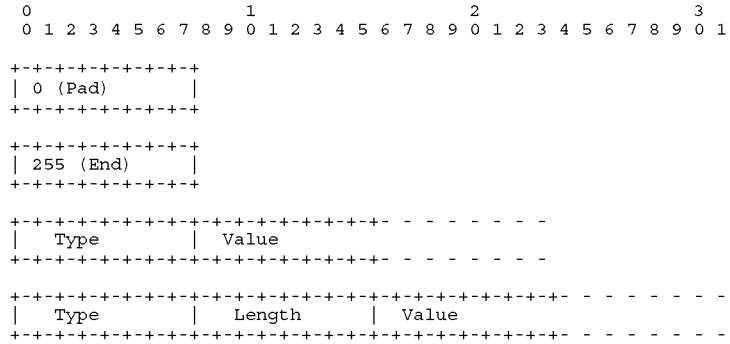

Defined Data Section Types

| Type# | Length Field? | Name |
|---|---|---|
| 0 | No (L = 1) | Pad |
| 1 | Yes | Error Return |
| 2 | Yes | Identification Data (Measurement Host) |
| 3 | Yes | Identification Data (Redirection Host) |
| 4 | No (L = 8) | Original Sender Address/Port |
| 5 | Yes | Redirect Security Option |
| 6 | Yes | Redirect Data |
| 7 | No (L = 12) | Redirect Options |
| 255 | No (L = 1) | End |

Original Sender Address/Port

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    00000100   |   Reserved    |       Original Src Port       |
+-+-+-+-+-+-+-+-+-+-+-+-+-+-+-+-+-+-+-+-+-+-+-+-+-+-+-+-+-+-+-+-+
|                     Original Source Address                   |
+-+-+-+-+-+-+-+-+-+-+-+-+-+-+-+-+-+-+-+-+-+-+-+-+-+-+-+-+-+-+-+-+
```

Redirect Security Option

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    00000101   |    Length     |         Security Type         |
+-+-+-+-+-+-+-+-+-+-+-+-+-+-+-+-+-+-+-+-+-+-+-+-+-+-+-+-+-+-+-+-+
|      Value
 - - - - - - - - - - - - - - - -
```

Redirect Options

TTL: 1 byte
DSCP: 1 byte
Start TTL: 1 byte
Destination Address: 4 bytes
Destination Port: 2 bytes
Options: 2 bytes

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    00000111   |      TTL      |     DSCP      |   Start TTL   |
+-+-+-+-+-+-+-+-+-+-+-+-+-+-+-+-+-+-+-+-+-+-+-+-+-+-+-+-+-+-+-+-+
|                      Destination Address                      |
+-+-+-+-+-+-+-+-+-+-+-+-+-+-+-+-+-+-+-+-+-+-+-+-+-+-+-+-+-+-+-+-+
|       Destination Port        |          IPMP Options         |
+-+-+-+-+-+-+-+-+-+-+-+-+-+-+-+-+-+-+-+-+-+-+-+-+-+-+-+-+-+-+-+-+
```

Error Return

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    00000001   |    Length     |          Error Type           |
+-+-+-+-+-+-+-+-+-+-+-+-+-+-+-+-+-+-+-+-+-+-+-+-+-+-+-+-+-+-+-+-+
|      Value
 - - - - - - - - - - - - - - - -
```

Error Types

| Value | Error |
|---|---|
| 1 | Bad Checksum |
| 2 | Missing Required Data Elements |

-continued

| | |
|---|---|
| 3 | Security Option Required |
| 4 | Security Option Rejected |

IPMP Options

```
 0                   1
 0 1 2 3 4 5 6 7 8 9 0 1 2 3 4 5
+-+-+-+-+-+-+-+-+-+-+-+-+-+-+-+-+
|R|F|T|A|S|d|t|  r  |   P   | Res |
+-+-+-+-+-+-+-+-+-+-+-+-+-+-+-+-+
```

R = Record Path Record: 1 bit
F = Fastpath ONLY Timestamps Requested: 1 bit
T = Timestamps Requested: 1 bit
A = All Extra Info Requested: 1 bit
S = Swap Faux Ports on Echo: 1 bit
d = Data Section Present: 1 bit
t = Toggle Record Path on Echo: 1 bit
r = Reverse Path TTL: 2 bits
P = Packet Type: 3 bits

| Value | Packet Type |
|---|---|
| 000 | Echo Request |
| 001 | Echo Reply |
| 010 | Information Request |
| 011 | Information Reply |
| 100 | Redirected Echo Request |
| 101 | Redirected Echo Reply |
| 110 | Echo Redirect Request |
| 111 | Echo Redirect Reply |

Reverse Path TTL

| Value | New TTL |
|---|---|
| 00 | Unchanged |
| 01 | 63 |
| 10 | 127 |
| 11 | 255 |

Record Path Record

If this field is 1 then a Path Record SHOULD be inserted by any device that forwards this packet. If the field is 0 then a device forwarding the packet MUST NOT insert a Path Record into the packet. The echoing host MAY insert a Path Record on reception or transmission of the packet even if doing so would otherwise be prohibited by this option.

Fastpath ONLY Timestamp Requested

If this field is 1 then a Path Record SHOULD NOT be inserted unless it can be done in the same processing path that would be taken by a regular data packet. The objective of this option is to allow measurement to be restricted to those points where inserting the path record will not affect the forwarding of the IPMP packet with respect to non-IPMP packets. This may be of use if the IPMP packet is being inserted periodically into a stream of packets so that the position of the IPMP packet in the data stream is not disturbed.

Timestamp Requested

If this field is 1 then any Path Records inserted into the packet SHOULD include a timestamp in the path record. If this field is 0 then any Path Records inserted into the packet SHOULD NOT contain a timestamp. This field allows the IPMP packet to be used to perform a function similar to traceroute, without the need to collect timing data.

All Extra Info Requested

If this field is 1 then any Path Records inserted should contain any optional information elements that a device may choose to insert. This option allows for elements to advertise any additional properties of the path taken by the IPMP packet that they choose to make available.

Swap Faux Ports on Echo

If this field is 1 then the echoing host MUST swap the values in the Faux Src/Dst Port fields when returning the packet. This allows both forward and backward paths of a flow to be measured by one packet. The swapping of the ports is needed to insure that any packet filters act on the packet as if it were part of the flow being measured.

Request/Reply

If this field is 1 then the IPMP packet is a Request packet, if the field is 1 it is a Reply packet.

Toggle Record Bit on Echo

If this field is 1 then the echoing host MUST toggle the value of the Record Path Record field when it receives the packet. This allows for path records to be recorded in only one direction by turning on or off the stamping process when the packet reaches the echoing host.

Path Record Formats

Without Timestamp

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|1|1|     Flags       |    Reserved   |       TTL             |
+-+-+-+-+-+-+-+-+-+-+-+-+-+-+-+-+-+-+-+-+-+-+-+-+-+-+-+-+-+-+-+-+
|                          Address                              |
+-+-+-+-+-+-+-+-+-+-+-+-+-+-+-+-+-+-+-+-+-+-+-+-+-+-+-+-+-+-+-+-+
|                        Reference ID                           |
 - - - - - - - - - - - - - - - - - - - - - - - - - - - - - - -
|                         Extensions                            |
 - - - - - - - - - - - - - - - - - - - - - - - - - - - - - - -
```

With Timestamp

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Flags            |            Timestamp                  |
+-+-+-+-+-+-+-+-+-+-+-+-+-+-+-+-+-+-+-+-+-+-+-+-+-+-+-+-+-+-+-+-+
|          Timestamp                    |         TTL           |
+-+-+-+-+-+-+-+-+-+-+-+-+-+-+-+-+-+-+-+-+-+-+-+-+-+-+-+-+-+-+-+-+
|                          Address                              |
+-+-+-+-+-+-+-+-+-+-+-+-+-+-+-+-+-+-+-+-+-+-+-+-+-+-+-+-+-+-+-+-+
|                        Reference ID                           |
 - - - - - - - - - - - - - - - - - - - - - - - - - - - - - - -
|                         Extensions                            |
 - - - - - - - - - - - - - - - - - - - - - - - - - - - - - - -
```

Extensions Format

```
 0                   1                   2                   3
 0 1 2 3 4 5 6 7 8 9 0 1 2 3 4 5 6 7 8 9 0 1 2 3 4 5 6 7 8 9 0 1

+-+-+-+-+-+-+-+-+
|    0 (Pad)    |
+-+-+-+-+-+-+-+-+

+-+-+-+-+-+-+-+-+
|   255 (End)   |
+-+-+-+-+-+-+-+-+

+-+-+-+-+-+-+-+-+-+-+-+-+-+-+-+-+- - - - - - -
|     Type      |     Value     |
+-+-+-+-+-+-+-+-+-+-+-+-+-+-+-+-+- - - - - - -

+-+-+-+-+-+-+-+-+-+-+-+-+-+-+-+-+-+-+-+-+-+-+-+-+- - - - - - -
|     Type      |    Length     |     Value     |
+-+-+-+-+-+-+-+-+-+-+-+-+-+-+-+-+-+-+-+-+-+-+-+-+- - - - - - -
```

Defined Extension Types

| Type# | Length Field? | Name |
| --- | --- | --- |
| 0 | No (L = 1) | Pad |
| 1 | Yes | Reference ID Extension |
| 2 | No (L = 13) | IPv6 Address (partial) |
| 3 | Yes | Link Speed (in kbps) |
| 4 | Yes | Link MTU (in bytes) |
| 6 | No (L = 3) | Queuing Type |
| 7 | No (L = 3) | Congestion Control Type |
| 255 | No (L = 1) | End |

Flags

```
 0                   1
 0 1 2 3 4 5 6 7 8 9 0 1 2 3 4 5
+-+-+-+-+-+-+-+-+-+-+-+-+-+-+-+-+
| TT |F|AT | L | Accuracy|T|E|R|
+-+-+-+-+-+-+-+-+-+-+-+-+-+-+-+-+
```

Flag Fields

TT = Timestamp Type
  0 = Undefined

-continued

```
  1 = Local source
  2 = External (Stratum ?) source
  3 = Reserved
  4 = Reserved
  5 = –UTC
  6 = UTC
  7 = No Timestamp
F = Processed in "Fastpath"
  0 No
  1 Yes
AT = Address Type
  0 = IP address of interface
  1 = IP address of interface (non-responsive)
  2 = IP address of IPMP proxy + Reference ID
  3 = Non-IP address
L = Stamping Location
  0 = Packet RX
  1 = Packet TX
  2 = Internal processing
  3 = Unspecified
A = Accuracy
  0-31, most accurate bit position in timestamp, compared to 'real
  time clock' on the device, this will be the worst of the number
  of bits of resolution of the device's clock and the maximum time
  difference between the real time clock at the time the packet is
  stamped and the value of the timestamp placed in the packet.
T = Tunnel [De/En] capsulation Point
  0 = No
  1 = Yes
E = Extensions
  0 = No
  1 = Yes
R = Reserved
Version = 0
```

Faux Source Port, Faux Destination Port

In order for IPMP to be used to monitor the characteristics of the path being taken by the data packets of an application it will be necessary for the IPMP packets to be filtered and queued in a manner identical to that of user data packets. In order to allow such filtering to be performed, in the location where the source and destination port fields of a TCP/UDP packet are located an IPMP packet contains two "faux" port fields, which allow it to be matched to any per flow filters that might be in use. The real source and destination port fields used by the IPMP packet are found further down in the IPMP packet header.

The IPMP packet queue value, the IPMP packet source port queue value, and the IPMP packet destination port queue value allow an IPMP measurement packet to be queued or filtered based on a five-tuple of values when combined with the IP source and destination addresses.

Faux P-Type (Packet Type)

For those devices with packet filters that include the packet type field of the IP header in determining how to process a packet, and are IPMP aware, this field SHOULD be used by the filter in place of the actual packet type field, which will always contain the IPMP packet type.

Checksum

The checksum is the 16-bit one's complement of the one's complement sum of the IPMP packet message starting with the Faux Source Port. For computing the checksum, the checksum is initialized to zero.

Path Pointer

The position, in bytes from the beginning of the IPMP packet, of the next available path record location.

The Path Pointer MUST always point to a word (4 byte) aligned location in the packet.

Length

The total length, in bytes, of the IPMP packet. The length should not normally exceed 556 bytes. That is the data field plus the space allocated for path records should not exceed 544 bytes. Longer packets risk being discarded if they need to be forwarded over a path with an MTU less that 576. Within these limits a maximum of 45 path records may be included in the packet, allowing 4 bytes for a unique identifier in the data field.

Returned TTL

Zero in the echo request. The value of the IP header TTL field when the packet was received by the echoing system in the echo reply.

Data

The data field is set by the measurement host. The echo reply contains an identical data field to the echo request. The content of the data field must allow the echo reply to be matched with the echo request when it arrives at the measurement host.

TTL

The value of the TTL field in the Path Record is set to the value of the TL in the packet when transmitted by the device, which inserted the Path Record.

By comparing the TTL field of consecutive Path Records it can be determined if the time delta between two consecutive Path Records measures the time between two directly connected devices or if there are intermediate (non-IPMP aware) devices between the those that inserted the Path Records.

Stamping Location

The Stamping Location field indications where in the device the Path Record was inserted into the Echo Request packet.

If the field value is 0 then the Path Record was inserted at the interface where the packet was received. If the field value is 1 then the Path Record was inserted at the interface where the packet was transmitted. If the field value is 2 then the Path Record was inserted at an internal location in the device. If the field value is 3 then the Path Record was inserted at an unknown/unspecified location in the device.

Usage Example

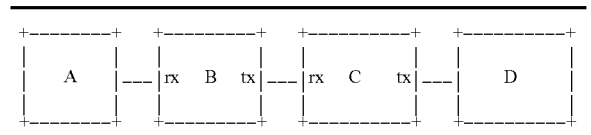

If host A sends an Echo Request to D with a TTL of 255 and both B and C insert Path Records, with TTLs of 254 and 253, then when the Echo Request returns to A it can determine that there are no devices between B and C. But without knowing the stamping location it does not know what was measured. Suppose that B stamped at the 'rx' location and C stamped at the 'rx' location then the difference in the timestamps would be due to the processing at B and the propagation delay of the B→C link, and any variation in the difference seen over repeated measurements would be due entirely to variations in delay within B. However if C stamped at 'tx' instead of 'rx' than any variation between measurements may be caused by either B or C or both. By marking the stamping location it is possible to determine what was or was not measured by the difference in two consecutive timestamps.

Address

If the value of the Address Type field is 0, the Address field MUST contain the address of the interface at which the packet was processed by the system that inserted the Path Record into the Echo Request or Echo Reply packet, as well as the address to which any Information Request packets should be sent to.

If the value of the Address Type field is 1, the Address field MUST contain the address of the interface at which the packet was processed by the system that inserted the Path Record into the Echo Request or Echo Reply packet. Unlike the case above, if the field value is 1 the system will NOT respond to Information Request packets at this address.

If the value of the Address Type field is 2, the Address field contains the IP address of an IPMP packet 'proxy' which will reply to Information Request packets on behalf of the system, which inserted the Path Record. If the value of the Address Type field is 1 there MUST be a Reference ID field in the Path Record. The value in the Reference ID field identifies the interface at which the packet was processed by the system that inserted the Path Record. For any given 'proxy' address the value of a Reference ID MUST uniquely identify an interface, but the same value MAY used by different proxy addresses to identify different interfaces.

This flag is designed to allow a system operator to support the IPMP without requiring the processing of Information Request packets by the interfaces that inserted the Path Records. If the value of the Address Type field is 3, the Address field contains a non-IP address value, more accurately it contains a value which is not the IP address of the interface, which inserted the Path Record, since it may be any 32 bit value it MAY by chance be an IP address of some other system. The value of the Address field SHOULD be static while a system is up. The value SHOULD be static across system restarts. The value is not guaranteed to be globally unique, but SHOULD be unique at least amongst systems belonging to the same AS.

This value is designed to allow a system operator to support the IPMP without being required to expose the addresses of their systems to the protocol while still providing a unique identifier to be associated with the interface, which inserted the Path Record. If the value in the Address field is not the IP address of the receiving interface or of an IPMP packet 'proxy' this value MUST be used. This value SHOULD also be used if the IP address of the interface is a 'private' address, e.g. 10.0.0.1.

Timestamp

The time at which the Path Record is inserted into the packet is recorded as a reduced size form of an RFC1305 NTP format timestamp. The relationship between this timestamp and real time, if there is one, may be derived using information from an IPMP Information Reply packet, or it may be inferred from a combination of the Fastpath, Timestamp Type and Accuracy fields. This reduced size timestamp is designed to allow the entire Path Record to fit into 3 words, or 4 words for Path Records with a Reference ID.

Timestamp Type

The Timestamp Type field gives an indication of the clock source that the timestamp was derived from. If the Timestamp Type is 0 then the clock source is of undefined quality and/or may be subject to arbitrary amounts of drift. An example case would be a PC router using the OS clock for the timestamp, in this case the software performing the stamping may have no knowledge of the quality of the clock source and the value of the OS clock may be subject to large adjustments.

If the Timestamp Type is 1 then the clock source is a local oscillator which may drift but which is not subject to adjustments. Different stamping points on a device with a Type 1 source are neither guaranteed to have the same rate of drift nor to have identical values. If the Timestamp Type is 2 then the clock source is an external clock signal of quality and is not subject to adjustments. Different stamping points on a device with a Type 2 source are not guaranteed to have identical values, but they are guaranteed to have the same drift rate. If the Timestamp Type is 5 then the clock source is an external clock signal of (Stratum 1/GPS) quality (i.e., it does not drift because it IS the reference time), which is not subject to adjustments. Further the second's value in at least the 3 highest order bits of the timestamp, corresponding to bits 16-18 of an NTP timestamp, will have a value which differs by no more than ±/−2 from the value of bits 16-18 of an NTP timestamp from a station at (+0 GMT). This allows the 'missing' upper bits to be determined if the receiver knows the correct value of real time (+0 GMT). Different stamping points on a device with a Type 5 source are not guaranteed to have identical values, but they are guaranteed to have the same (~0) drift rate. If the Timestamp Type is 6 then the device inserting the Path Record asserts that the value in the Timestamp IS the UTC time value for +0 GMT, within the accuracy as defined by the Accuracy flag. Different stamping points on a device with a Type 6 source are guaranteed to have the same time value (±/− Accuracy) and the same (~0) drift rate.

Fastpath

If the Fastpath field value is 1, aside from the alterations to contents of the IPMP packet, the IPMP packet was processed and routed identically to a normal data packet containing the same IP header fields (addresses, ports, DSCP). This field allows the measurement host to determine how close the reported times reflect the delays seen by regular data packets.

Tunnel

If the Tunnel Encapsulation field is 1 then the device inserting the Path Record is a de/en-capsulation point for the packet. This may be any form of encapsulation that will prevent the insertion of Path Records and results in transmission over equipment with variable delays. For example, IPSEC tunnels, MPLS encapsulation, IP-over-ATM, etc. The flag deliberately does not indicate if the stamping device is the source or end point of a tunnel since unless all devices along the path are IPMP aware it might be possible to have two records the first indicating an encapsulation followed by one indicating a decapsulation making it appear that there was a tunnel between the two points, when in fact there was more than one tunnel between the two points.

IPMP Information Request and Information Reply Packets

Information Request

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       0000000000000000        |       0000000000000000        |
+-+-+-+-+-+-+-+-+-+-+-+-+-+-+-+-+-+-+-+-+-+-+-+-+-+-+-+-+-+-+-+-+
|    Version    |   Info  Flags |            Checksum           |
+-+-+-+-+-+-+-+-+-+-+-+-+-+-+-+-+-+-+-+-+-+-+-+-+-+-+-+-+-+-+-+-+
|       0000000000000000        |             Length            |
+-+-+-+-+-+-+-+-+-+-+-+-+-+-+-+-+-+-+-+-+-+-+-+-+-+-+-+-+-+-+-+-+
|          IPMP Flags           |
+-+-+-+-+-+-+-+-+-+-+-+-+-+-+-+-+-+-+-+-+-+-+-+-+-+-+-+-+-+-+-+-+
|          Source Port          |        Destination Port       |
+-+-+-+-+-+-+-+-+-+-+-+-+-+-+-+-+-+-+-+-+-+-+-+-+-+-+-+-+-+-+-+-+
|                          Request ID                           |
+-+-+-+-+-+-+-+-+-+-+-+-+-+-+-+-+-+-+-+-+-+-+-+-+-+-+-+-+-+-+-+-+
|                      Forwarding IP Address                    |
+-+-+-+-+-+-+-+-+-+-+-+-+-+-+-+-+-+-+-+-+-+-+-+-+-+-+-+-+-+-+-+-+
|                          Reference ID                         |
 - - - - - - - - - - - - - - - - - - - - - - - - - - - - - - -
|                           Extensions                          |
 - - - - - - - - - - - - - - - - - - - - - - - - - - - - - - -
|       0000000000000000        |           Timestamp           |
 - - - - - - - - - - - - - - - - - - - - - - - - - - - - - - -
|             Timestamp                         |     Last      |
 - - - - - - - - - - - - - - - - - - - - - - - - - - - - - - -
```

Info Flags

```
 0
 0 1 2 3 4 5 6 7
+-+-+-+-+-+-+-+-+
|R|T|E Reserved |
+-+-+-+-+-+-+-+-+
```

R = Reference ID Present

If this flag is 1 then the information request packet contains a Reference ID.

T = Timestamps Present

If this flag is 1 than the information request packet contains one or more Timestamps.

E = Reference ID Extension Present

If this flag is 1 then the information request packet contains a Reference ID Extension.

Information Reply

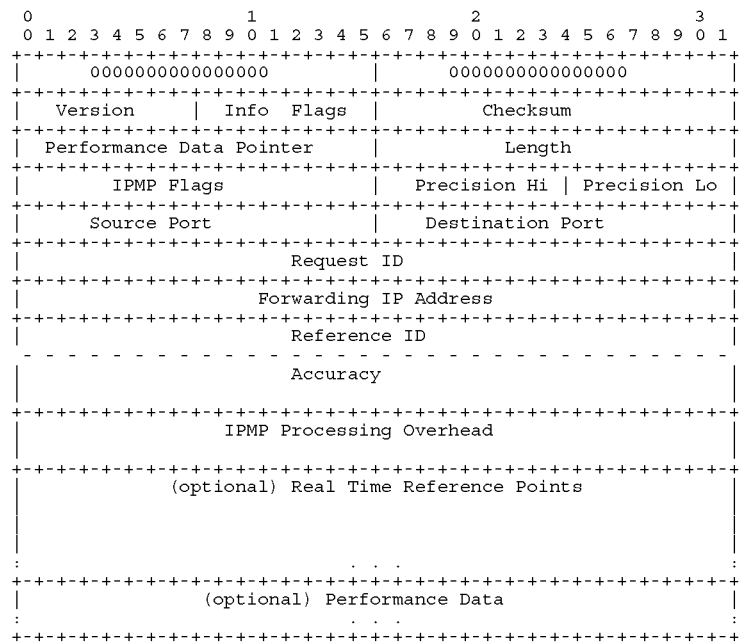

Real Time Reference Point

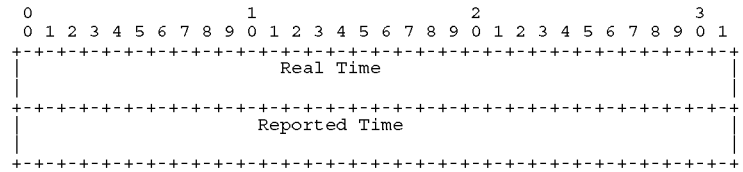

Version = 0.

Flags

The Flags field indicates the presence of optional elements in the information request. The information reply MUST contain the same value in the Flags field as the request packet contained.

Last

If there is a timestamp included in the information request the Last field indicates which is the last timestamp. If the Last field is 0 then another timestamp follows, if the Last field is any non-zero value then there are no more timestamps.

Checksum

The checksum is the 16-bit one's complement of the one's complement sum of the IPMP packet message starting with the version number. For computing the checksum, the checksum and returned checksum fields are zero.

Precision Hi

The number of bits in the whole seconds part of timestamps that are valid. A Precision Hi of N, means that the timestamps wrap around every 2^N seconds.

Precision Lo

The number of bits in the fractional part of timestamps that are valid.

Length

The total length, in bytes, of the IPMP packet. The length should not normally exceed 556 bytes. That is the Real Time Reference Points and Performance Data fields should not exceed 524 bytes. Longer packets risk being discarded if they need to be forwarded of a path with a MTU less that 576. If no performance data is included 32 Real Time Reference Points may be included in the packet. The IPMP packet MAY be the MTU size supported by the path, so equipment should be prepared to process IPMP packets of this size.

Performance Data Pointer

The position, in bytes from the beginning of the IPMP packet, of the performance data field if it exists. If there is no performance data this field is 0.

Forwarding IP Address

The address of the interface to which the Information Request was sent.

Accuracy

The maximum difference between actual real time and the inferred real time of any timestamp generated by this interface. If there is no relationship between real time and the timestamps recorded by the interface or the extent of the difference from real time is unknown accuracy is set to 0.

IPMP Packet Processing Overhead

The maximum difference between the time taken to process and forward an IPMP packet and the time taken to forward an IP packet with the same characteristics. If the overhead is unknown this is reported as MAX—TIME, i.e. all bits to 1.

Real Time Reference Point

A real time reference point gives the relationship between real time and the timestamp that would have been placed in a Path Record by the interface at that time. If there is no relationship between real time and timestamps no reference points are included in the Information Reply.

If there were any timestamps present in the information request packet then the reply packet SHOULD contain a real time reference point corresponding to each timestamp in the request packet. If the host does not believe that a valid reference point can be returned, for example if the host recently restarted and believes the timestamp was taken before the restart, it MAY return a reference point with a real time of 0, for the reported timestamp.

Performance Data

The Performance Data field allows arbitrary information from the MIB of the system or the interface to optionally be included in the Information Reply. It is formatted as a VarBindList from the SNMPv2-PDU. In this context ObjectSyntax is the only valid choice within VarBind.

```
I.E.
IPMP-PERFORMANCE-DATA DEFINITIONS : := BEGIN
IMPORTS
        ObjectName, ObjectSyntax,
            FROM SNMPv2-SMI;
-- IPMP simplified list element
IPMPVarBind : :=
        SEQUENCE {
            name
                ObjectName,
            value
                ObjectSyntax
        }
-- variable-binding list
VarBindList : :=
        SEQUENCE (SIZE (0. .max-bindings)) OF
            IPMPVarBind
END
```

IP Protocol Header Values

Version=4

IHL=5

Identification=0

Flags=DF

Fragment offset=0

IP Protocol type=TO BE ASSIGNED.

IP options are forbidden.

Processing of IPMP Packets

Measurement Host Processing

Figure 1:
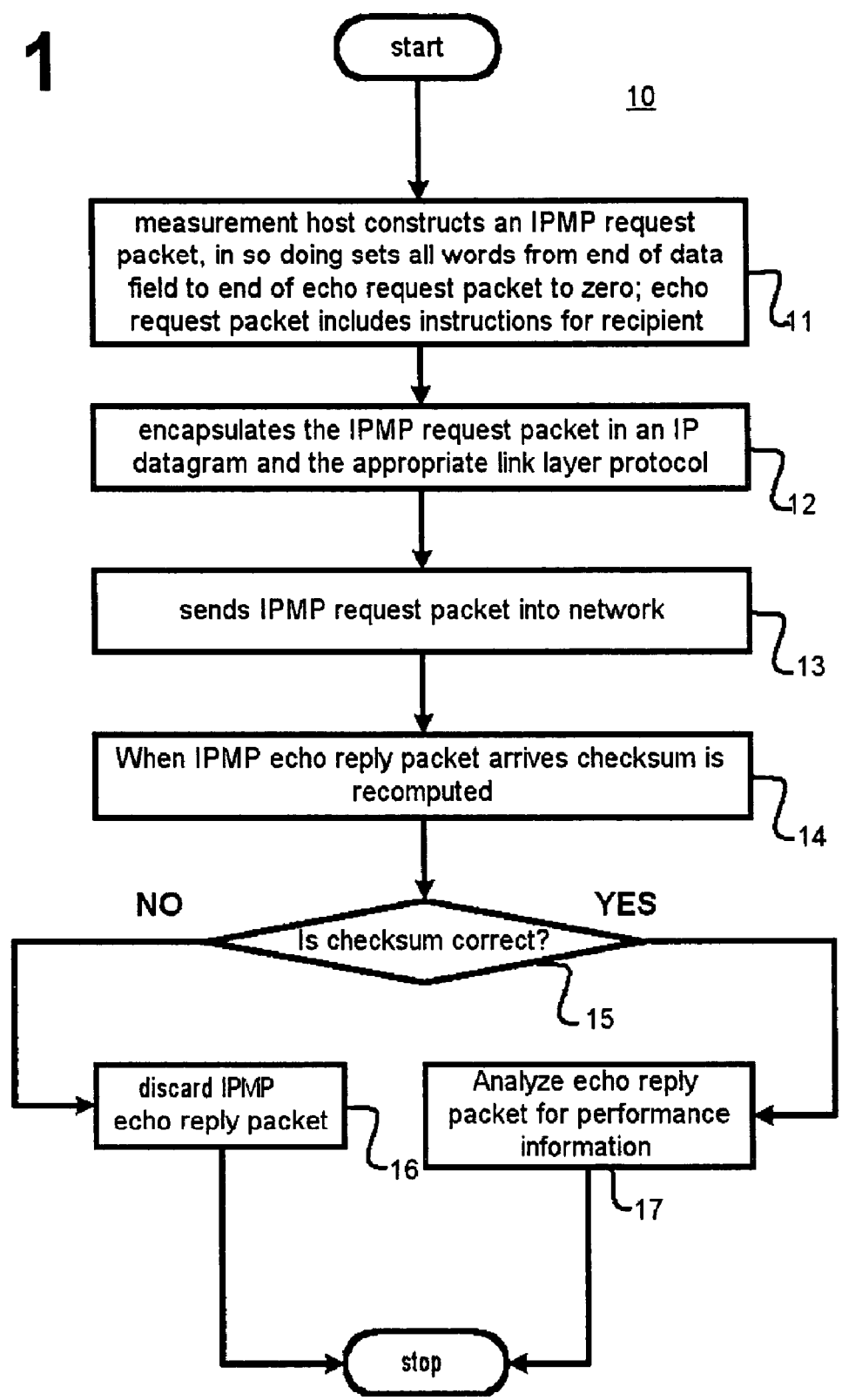
FIG. 1 depicts an exemplary embodiment of a method for performing a measurement of a remote host by using an Internet Protocol Measurement Protocol (IPMP) packet according to one aspect of the present invention.

Turning to FIG. 1, shown therein is an exemplary embodiment of a method 10 for creating an IPMP packet according to one aspect of the present invention. A measurement host constructs an IPMP request packet (element 11), encapsulates the IPMP request packet in an IP datagram and the appropriate link layer protocol (element 12) and sends the IPMP request packet into the network (element 13). Performance information is gleaned from the presence or absence of a reply, the delay between the request packet and the reply packet the value of TTL and the path record(s) if present and possibly the presence of errors (element 17).

The measurement host, when constructing the echo request, MUST set all words from the end of the data field to the end of the echo request packet (the space allocated for path records) to zero (element 11).

The data field SHOULD contain information that allows the measurement host to match echo replies to echo requests. The data field might also contain checking information for part or all of the data and/or control fields of the IPMP packet. This checking information SHOULD allow matching of echo requests and replies.

When an IPMP echo reply packet arrives the checksum is recomputed (element 14). Unless further protection is provided in the data field an IPMP echo reply packet with an incorrect checksum SHOULD be discarded (element 16) because of the risk of data corruption causing incorrect matching with the echo request, or the reporting of invalid measurement data.

Redirecting Measurement Host

Figure 2:
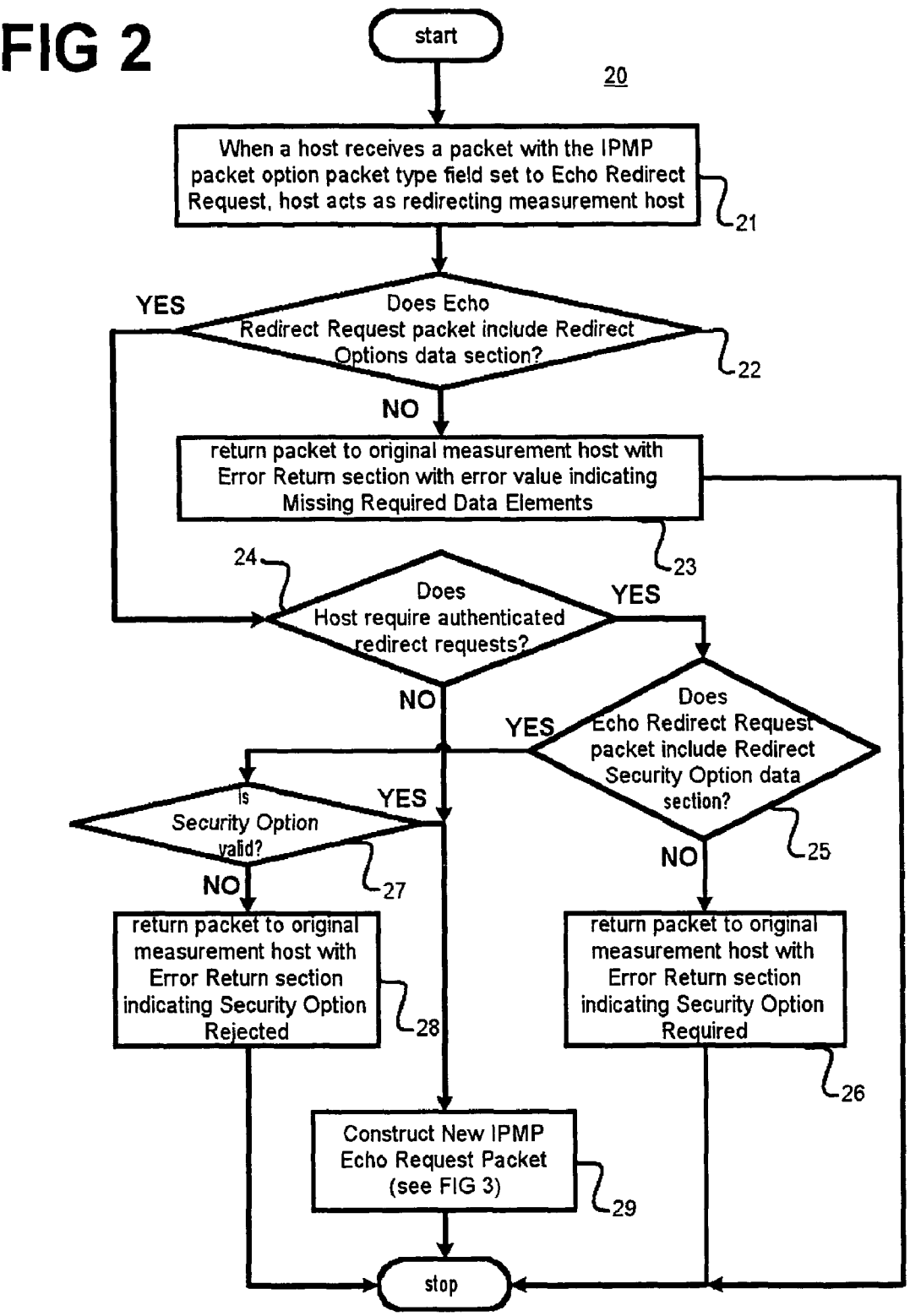
FIG. 2 depicts an exemplary embodiment of a method for responding to an IPMP redirection request packet sent from a measurement host according to another aspect of the present invention.

Turning to FIG. 2, shown therein is an exemplary embodiment 20 of a method for performing a remote test of a first network device connection to a second network device according to another aspect of the present invention. When a host receives a packet with the IPMP packet option packet type field of 6 (Echo Redirect Request), the host acts as a redirecting measurement host (element 21). The redirecting measurement host performs the following functions (elements 22-29):

1) Check for the presence of a Redirect Options data section (element 22).
   a) If no redirect options section present, return packet to original measurement host with an Error Return section with error value 2 (Missing Required Data Elements) (element 23), else go to 2)
2) If host requires authenticated redirect requests (element 24) (if not, go to 4), check for presence of Redirect Security Option data section (element 25).
   a) If no security option section present, return packet to original measurement host with an Error Return section with error value 3 (Security Option Required) (element 26)
3) If security option present and required, verify security option (element 27).
   a) If verification fails, return packet to original measurement host with an Error Return section with error value 4 (Security Option Rejected) (element 28), else go to 4).
4) Construct New IPMP Echo Request Packet (element 29).

Figure 3:
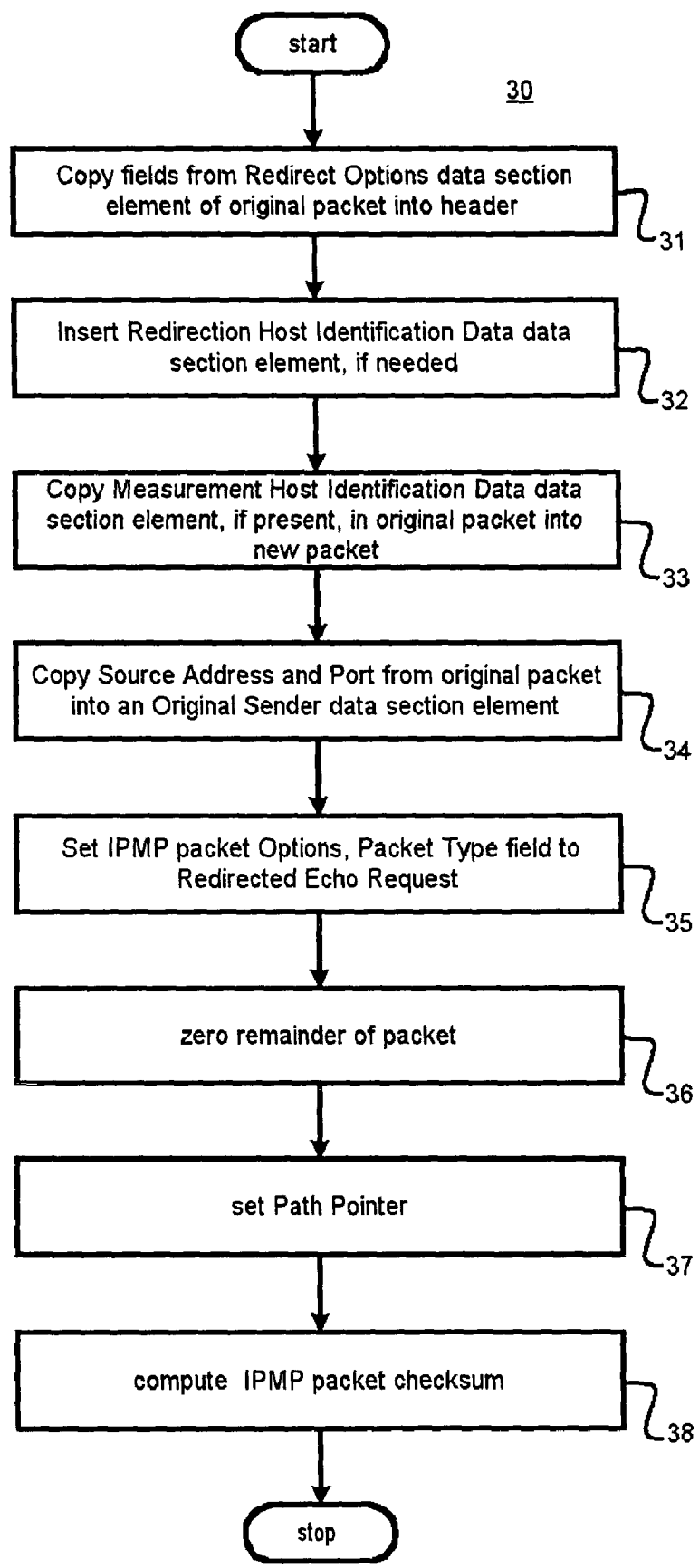
FIG. 3 depicts an exemplary embodiment of a method for constructing an IPMP echo request packet as part of a response to an IPMP redirection request packet from a measurement host according to yet another aspect of the present invention.

Turning to FIG. 3, shown therein is an exemplary embodiment of a method for constructing a New IPMP Echo Request Packet according to another aspect of the present invention. The method proceeds as follows:
   a) Copy fields from Redirect Options data section element of original packet into header (element 31)
   b) Insert (Redirection Host) Identification Data data section element if needed (element 32)
   c) Copy (Measurement Host) Identification Data data section element if present in original packet into new packet (element 33 d) Copy Src Address and Port from original packet into an Original Sender data section element.
e) Set IPMP packet Options, Packet Type field to 4 (Redirected Echo Request), zero remainder of packet, set Path Pointer and compute IPMP packet checksum.

Figure 4:
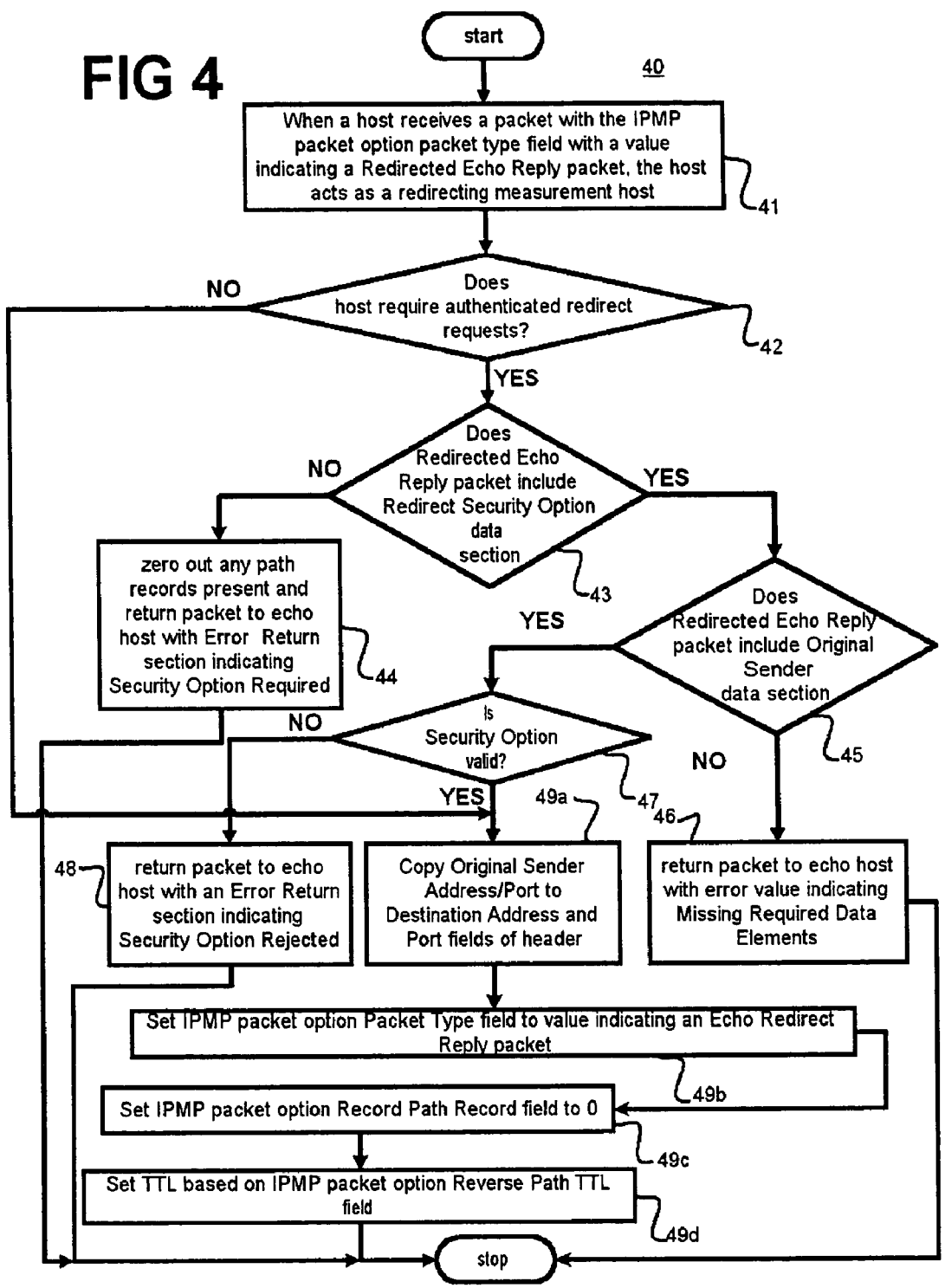
FIG. 4 depicts an exemplary embodiment of a method for responding to an IPMP echo reply packet sent in response to an IPMP echo request packet, which itself was created as a result of an IPMP redirection request packet from a measurement host, according to still another aspect of the present invention.

Turning to FIG. 4, shown therein is an exemplary embodiment 40 of a method for processing a redirected echo reply according to yet another aspect of the present invention. When a host receives a packet with the IPMP packet option packet type field of 5 (Redirected Echo Reply), the host acts as a redirecting measurement host (element 41). The redirecting measurement host performs the following functions:

1) If host requires authenticated redirect requests (element 42), check for presence of Redirect Security Option data section (element 43).
   a) If no security option section present, zero out any path records present and return packet to echo host with an Error Return section with error value 3 (Security Option Required) (element 44)
2) Check for presence of Original Sender data section (element 45).
   a) If no Original Sender data section present, return packet to echo host with error value 2 (Missing Required Data Elements) (element 46)
3) If security option present and required, verify security option (element 47).
   a) If verification fails, return packet to echo host with an Error Return section with error value 4 (Security Option Rejected) (element 48)
4) Copy Original Sender Address/Port to Destination Address and Port fields of header (element 49*a*).
5) Set IPMP packet option Packet Type field to 7 (Echo Redirect Reply) (element 49*b*)
6) Set IPMP packet option Record Path Record field to zero (0) (element 49*c*)
7) Set TTL based on IPMP packet option Reverse Path TTL field (element 49*d*).

Echoing System Processing

The IPMP Echo Request packet and Echo Reply packet formats are designed to make processing at the stamping points simple and efficient, at the echoing point however there are a number more complex functions that an echoing system may have to perform.

Figure 5:
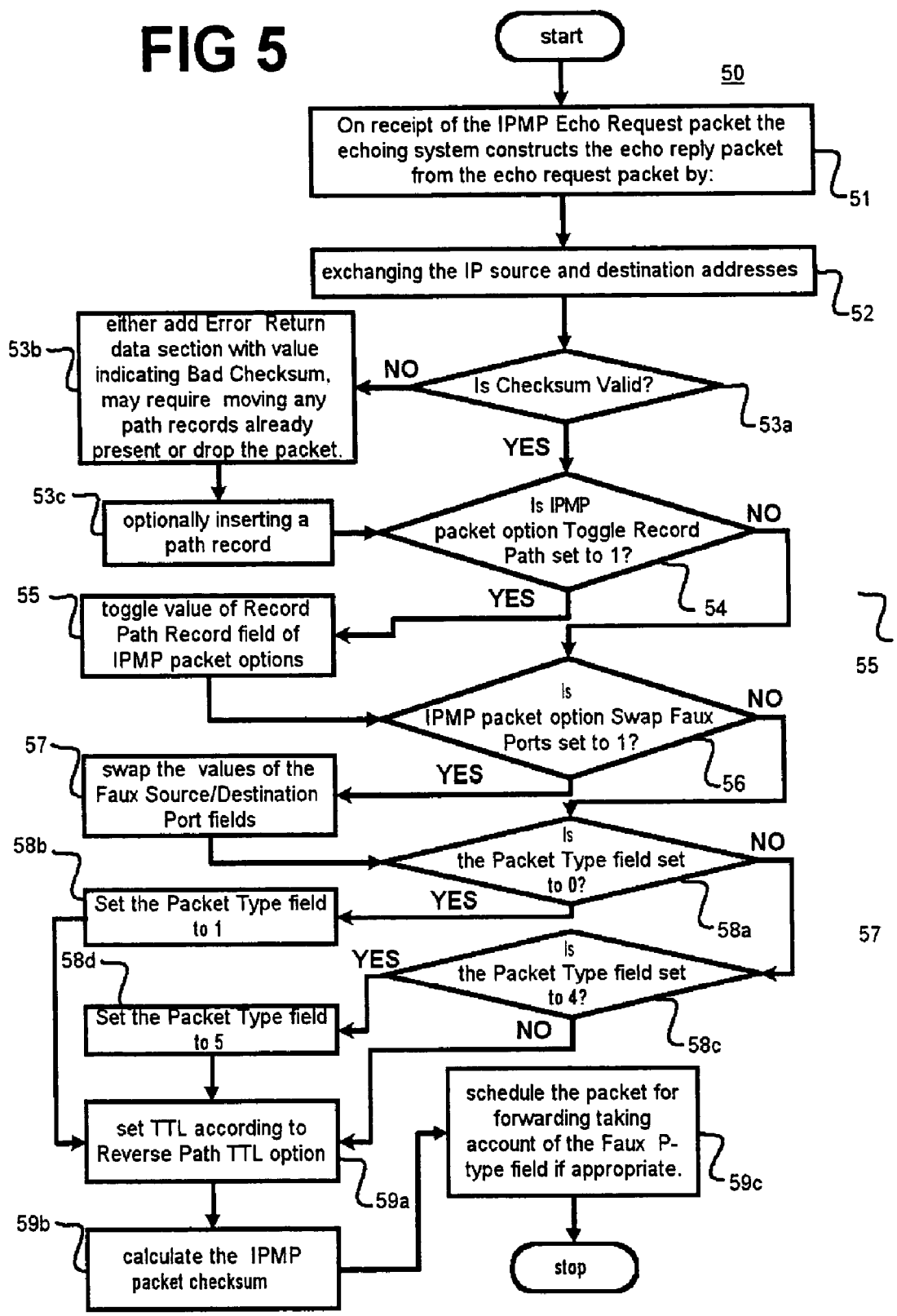
FIG. 5 depicts an exemplary embodiment of a method for responding to an IPMP echo request packet, which itself was created as a result of an IPMP redirection request packet from a measurement host, according to yet another aspect of the present invention.

Turning to FIG. 5, shown therein is an exemplary embodiment 50 of a method for processing an IPMP Echo Request packet according to still another aspect of the present invention. On receipt of the IPMP Echo Request (IPMP Option Packet Type=0 or 4) packet the echoing system constructs the echo reply packet from the echo request packet by (element 51):

1. exchanging the IP source and destination addresses (element 52)
2. checking the IPMP packet checksum (element 53*a*), if checksum invalid, either add Error Return data section with value 1 (Bad Checksum), may require moving any path records already present or drop the packet (element 53*b*).
3. optionally inserting a path record (as described in section 3.3.1) (element 53*c*).
4. if the IPMP packet option Toggle Record Path is set to 1 (element 54), then toggle the value of the Record Path Record field of the IPMP packet options (element 55).
5. if the IPMP packet option Swap Faux Ports is set to 1 (element 56), then swap the values of the Faux Source/Destination Port fields (element 57).
6. if the Packet Type field is 0 (element 58*a*), set it to 1 (element 58*b*), if 4 (element 58*c*), set it to 5 (element 58*d*).
7. set TTL according to Reverse Path TTL option (element 59*a*).
8. calculate the IPMP packet checksum (element 59*b*).
9. schedule the packet for forwarding taking account of the Faux P-type field if appropriate (element 59*c*).

Processing IPMP Information Request packets requires more resources than an Echo Request. Direct measurements are not made from Information Request packets. Consequently an implementer may choose to processes Information Request packets off the interface card and/or at low priority.

Forwarding System Processing

A forwarding router does not need to be IPMP aware. In the simplest case an IPMP packet is forwarded like any other IP protocol packet.

If the router forwards schedules packets based (perhaps in part) on the value of the IP protocol field, from the IP header, then the forwarding router must use the Faux P-type field of the IPMP packet header for scheduling instead of the IP protocol field. A forwarding router may include a path record as described below.

Path Record

Inclusion of path records is optional. A path record MAY be inserted by forwarding routers (on the forward or reverse path) and the echoing system.

A system that adds a path record MUST increase the Path Pointer by the size of the inserted path record, which must be a multiple of 4 bytes in length and must also update the Checksum field. The length of the packet is not changed. Before inserting the path record the path pointer plus the size of the path record MUST be compared with length to ensure that sufficient space is available for the new path record.

A system that adds a path record MAY include a timestamp in the path record using the timestamp NTP format. If it does not include a timestamp the timestamp field in the path record is left unaltered.

Denial of Service Attacks

Because IPMP echo request packets are processed with about the same effort as forwarding an IP packet they do not introduce any new denial of service opportunities.

IPMP Information Request packets require more processing and may be used as the basis of a denial of service attack in the same way as any information request on a router or host. Because Information Request packets are not used to make measurements an implementer may implement protection against denial of service attacks made with these packets in the same way as other information requests. This might involve processing IPMP Information Request packets at a low priority or regulating the maximum flow of packets. Since the IPMP Information Request packet is echoed by the responding interface it could be used as a reflector in a DOS attack by a host that sent packets with false source addresses. The use of a proxy host to respond to Information Request packets should make it possible to detect and stop such attacks. Also since the volume of legitimate IPMP Information Request packet traffic should be low, the proxy may simply limit how many requests it processes.

The use of the redirection function for a denial of service attack is addressed in the Security Considerations section.

Discussion

Checksums

The IPMP packet checksum is calculated by the measurement host when it creates the echo request packet. It is updated (as described in section 4.2.1) by forwarding routers that insert a route record into the IPMP packet. The checksum MUST be checked by the echoing host, and by the redirecting host (if any). Packets with bad IPMP packet checksum SHOULD be discarded, but hosts MAY choose to return a Bad Checksum Error Return instead.

Checksum Update at a Forwarding Router

A forwarding router that does not include a path record does not check or modify the IPMP packet checksum. (Normal IP forwarding occurs including decrementing TTL and updating the IP header checksum.) A forwarding router that includes a path pointer must update the IPMP packet checksum. This MAY be done in two ways:

a) Absolute. Check that the checksum matches for the received packet. If the checksum does not match, set the checksum in the forwarded packet to 0. If the checksum in the received packet does match add the Route Record to the packet and recalculate the checksum.

b) Relative. Form the checksum of the path record (this will be a constant for a particular interface if timestamps are not used) and the previous checksum. Option a) or b) is selected on the basis of efficiency.

If possible option b) SHOULD be used as option a) allows for errors to be introduced and then covered up.

Timestamps

The timestamp field is coded following the conventions described in RFC1305 NTP but using reduced number of bits.

NTP Timestamp Format

Summarizing from RFC1305:

In conformance with standard Internet practice, timestamps are specified as integer or fixed-point quantities, with bits numbered in big-endian fashion from 0 starting at the left, or high-order, position. All quantities are unsigned and may occupy the full field width with an implied 0 preceding bit 0. Timestamps are represented as a 64-bit unsigned fixed-point number, in seconds relative to 0 h on 1 Jan. 1900. The integer part is in the first 32 bits and the fraction part in the last 32 bits. In the fraction part, the non-significant low order can be set to 0.

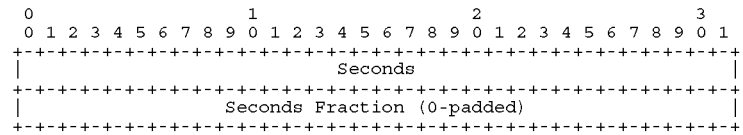

This format allows convenient multiple-precision arithmetic and conversion to UDP/TIME representation (seconds), but does complicate the conversion to ICMP Timestamp message representation, which is in milliseconds. The most future time that can be represented is 4,294,967 (some time in the year 2036) with a precision of about 200 picoseconds, which should be adequate for even the most demanding measurements. RFC 2030 (SNTP) contains a proposal for extending timestamps beyond the year 2036.

IPMP Timestamp Format

The IPMP Timestamp Format includes bits [16:31] of the 'seconds' word of an NTP timestamp and bits [0:23] of the 'seconds fraction' of an NTP timestamp. This format reduces the overall size of the Path Records. This reduced timestamp should be sufficient for all purposes of the IPMP being accurate to about 50 nanoseconds, and taking 18 hours for the seconds field to wrap around. If archival time stamps are needed then the sending host can use IPMP info request messages, if needed, to determine the values of the high order seconds bits.

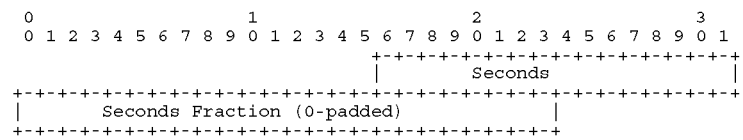

Inferred Real Time

The real time of the timestamp may be inferred when a system provides an IPMP Information Reply packet with at least one Real Time Reference Point earlier and one later than the timestamp. For the purpose of this inference the clock drift of the interfaces clock is assumed to be linear and linear interpolation is used between the two nearest Real Time Reference Points where one is greater than and one is less than, the timestamp. The accuracy field of an Information Reply reports the greatest difference between an inferred real time, calculated using linear interpolation, and true real time.

Minimum Implementations

Echoing System

The simplest echoing system implementation returns the IPMP echo request packet without a path record. As described in section 3.2 this only requires that the IP source and destination addresses be exchanged, the type field changed and the packet scheduled for forwarding. Because of the format of the IPMP echo request and echo reply packets this can be implemented with a very small number of instructions. A system that does not insert path records does not need to processes IPMP Echo Request packets.

Systems which just provide this level of implementation allow a number of measurements to be made that are not currently possible, particularly if they are routers that processes ICMP at a low priority to avoid DOS attacks.

Forwarding System

Forwarding systems do not need to be IPMP aware.

A forwarding system that is IPMP aware may include path records with only the Forwarding IP Address set. This requires writing the address to the packet and updating the checksum and Path Pointer in the packet as described in section 3.3.1 and 4.2.1. In this case the forwarding system does not need to process IPMP Information Request packets.

Security Considerations

The IPMP echo redirect mechanism provides a method by which packets can be directed to an arbitrary destination with a source address different than that of the host, which initially transmitted the packet. Such a mechanism could be subverted to allow a distributed denial of service (DDOS) attack that could not easily be traced back to its source. The IP Measurement Protocol provides a framework for authenticating packets so that the redirection function can be made available to a restricted set of requestors. IPMP is designed so that even an implementation which does not perform an authentication function on packets requesting redirection, while vulnerable to being used in a DDOS attack, insure that the original source address of the attacker will be carried in the redirected IPMP packets.

Limiting of Unauthenticated Redirects

It is suggested that any implementation that allows the redirection of unauthenticated echo request packets MUST limit the rate and/or number of in flight packets either in general or on a per destination basis. Such limiting SHOULD become more restrictive if replies are not received from the echo host(s). By limiting unauthenticated echoes quickly and severely if there is no response then the ability to use the IPMP redirect packet for DDOS attacks will be limited.

In addition it is suggested that any implementation that allows unauthenticated redirects SHOULD only do so after validating that the source address in the IPMP packet is not forged. This can be done in a number of ways:

a. if the measurement host is on the same local network as the redirection host, validation might be performed against the redirection hosts arp table.
b. in the case of ISP measurement, redirection might be restricted to hosts from a private subnet, e.g. 10.1.X.X where there is router filtering that prevents customer hosts or host outside the ISP from sending packets with addresses in that subnet.

The above IP Measurement Protocol defines the processing tasks for a router or other Internet device to permit direct measurement of the network. As such, the processor in a router along with embedded software will perform the necessary tasks set forth in the above IPMP packet. Thus upon receiving an IPMP compliant data packet, the router will process this data packet as set forth herein, and output the processed data packet using known techniques but in accordance with the description herein. Other hardware implementations will be apparent to those of skill in this art upon review of the IPMP set forth herein.

Figure 9:
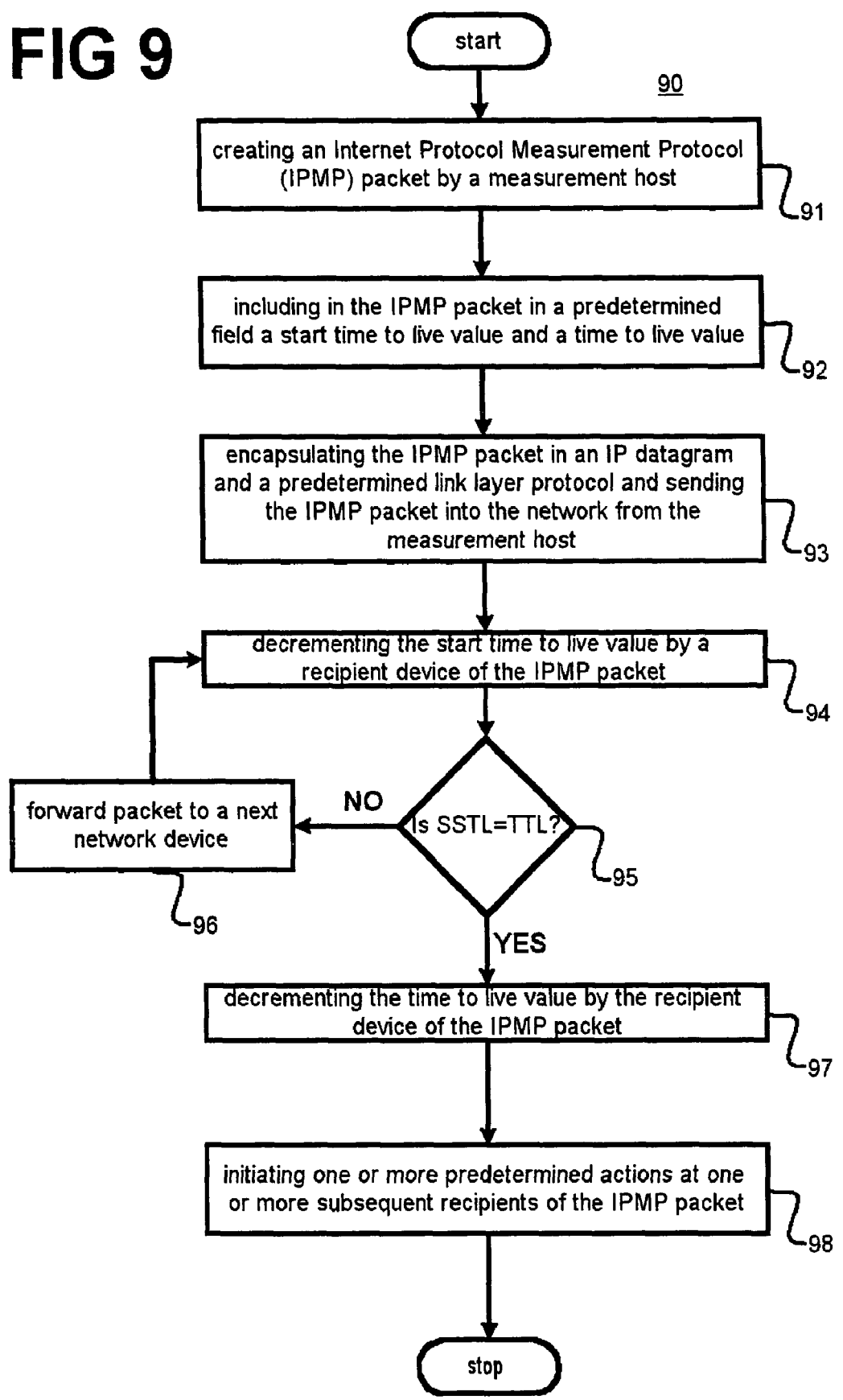
FIG. 9 shows an exemplary embodiment of a method for using the Start Time to Live capability according to yet another aspect of the present invention.

Turning to FIG. 9, shown therein is a method for using the Start Time to Live capability to enable or prevents measurements from being taken until the Time to Live (TTL) counter reaches a certain value, which allows for measurement of very long paths or use of very short packets, in which it is not possible to fit all the measurement records into a single measurement packet. The process 90 begins by creating an Internet Protocol Measurement Protocol (IPMP) packet by a measurement host (element 91). The IPMP packet includes in a predetermined field a start time to live value and a time to live value (element 92). The measurement host encapsulates the IPMP packet in an IP datagram and a predetermined link layer protocol and sends the IPMP packet into the network (element 93). Each recipient device decrements the start time to live value (element 94). The start time to live value is then compared to the time to live value and if equal (or less than) (element 95), the recipient decrements the time to live value (element 97). If not, the IPMP packet is forwarded to the next network device (element 96). Once the start time to live value reaches the time to live value, certain predetermined actions will begin at the current recipient of the IPMP packet and subsequent recipients (element 98).

Figure 10:
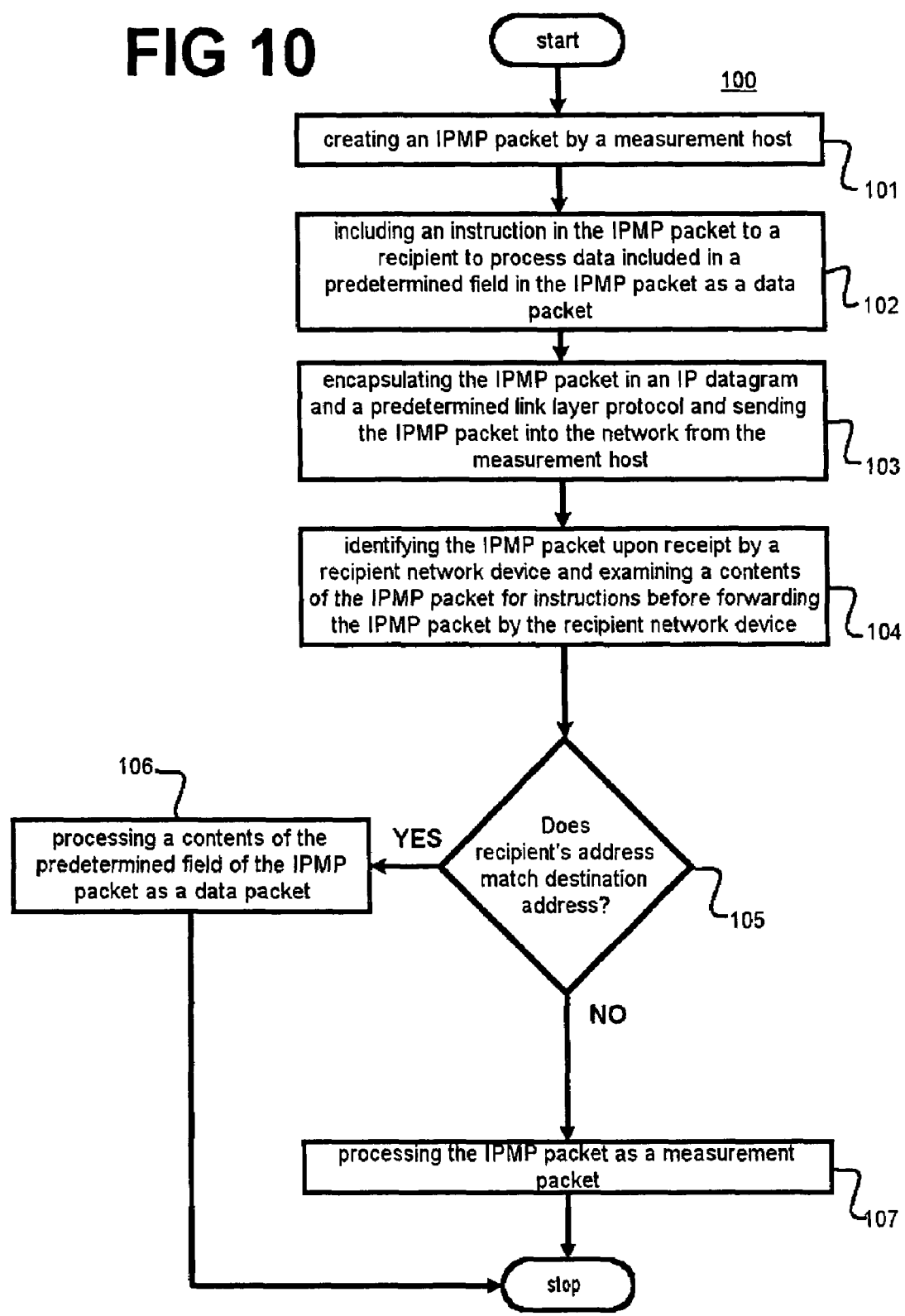
FIG. 10 shows an exemplary embodiment of a process for using the IP Measurement Protocol to transmit regular data packets according to still another aspect of the present invention.

Turning to FIG. 10, shown therein is an exemplary embodiment 100 of a process for using the IP Measurement Protocol to provide that a regular data packet be replaced with an IPMP packet, which includes in one of the data sections extensions the data that would have been in the regular protocol packet, plus a flag that says "take this data out and process this data as if this data had been the only contents of a non-IPMP packet, where the faux ports and packet type were the real ports and packet type." As such, a router or other similar device then processes the packet accordingly. The process begins by creating an IPMP packet by a measurement host (element 101) and including an instruction in the IPMP packet to a recipient to process data included in a predetermined field in the IPMP packet as a data packet (element 102). The measurement host encapsulates the IPMP packet in an IP datagram and a predetermined link layer protocol and sends the IPMP packet into the network from the measurement host (element 103). Upon receipt by a recipient network device, the recipient identifies the packet as an IPMP packet and examines a contents of the IPMP packet for instructions before forwarding the IPMP packet (element 104). If the address of the recipient device matches the destination address of the IPMP packet (element 105), the recipient network device processes a contents of a predetermined field of the IPMP packet as a data packet (element 106). If not, the recipient processes the IPMP packet as a measurement packet (element 107).

Figure 11:
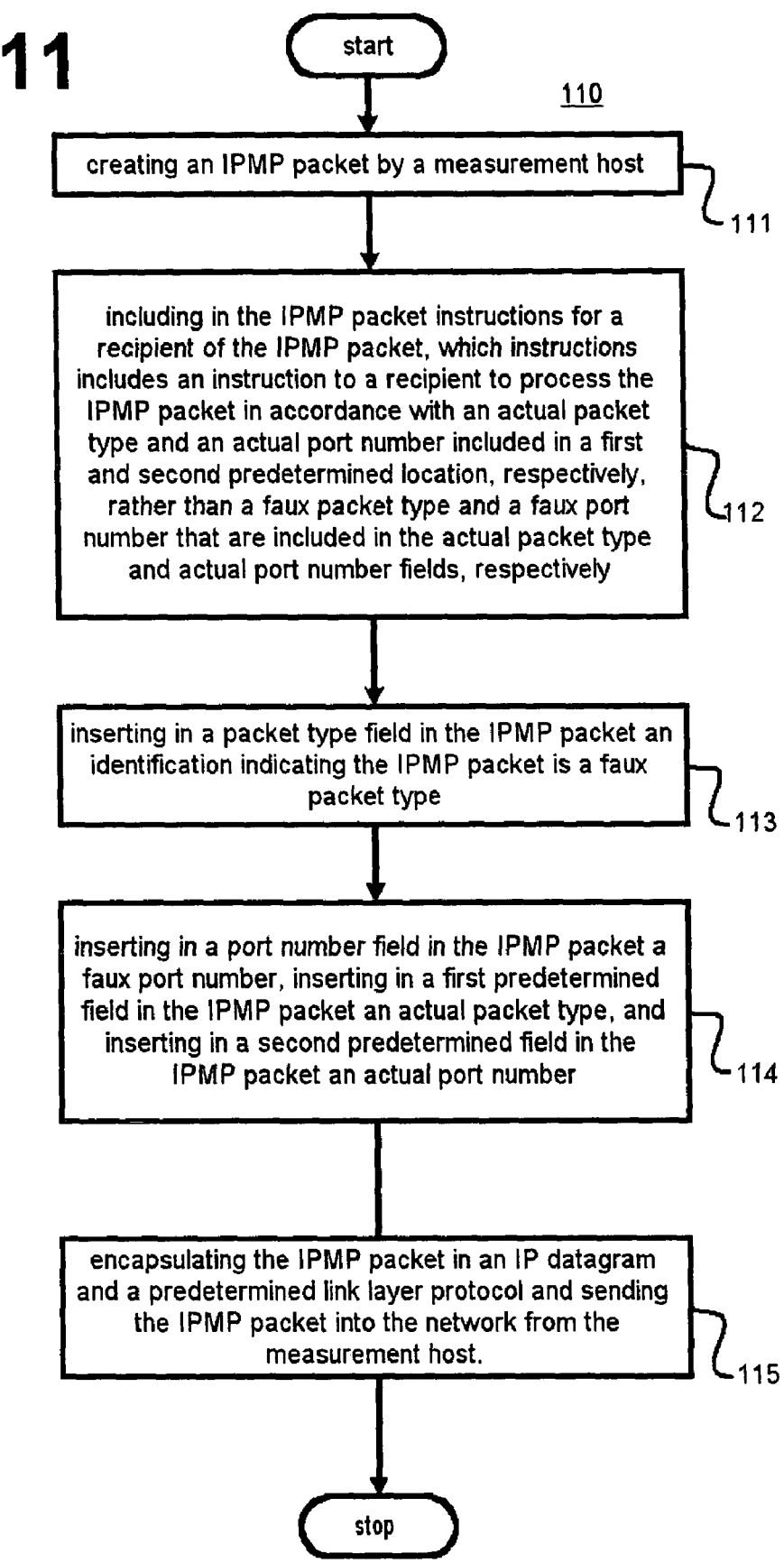
FIG. 11 shows an exemplary embodiment of a method for creating an IPMP packet with a faux port according to yet another aspect of the present invention.

Turning to FIG. 11, shown therein is an exemplary embodiment 110 of a method for creating an IPMP packet with a faux port. The measurement host creates an IPMP packet (element 111). The measurement host includes in the IPMP packet instructions for a recipient of the IPMP packet, which instructions includes an instruction to a recipient to process the IPMP packet in accordance with an actual packet type and an actual port number included in a first and second predetermined location, respectively, rather than a faux packet type and a faux port number that are included in the actual packet type and actual port number fields, respectively (element 112). The measurement host inserts in a packet type field in the IPMP packet an identification indicating the IPMP packet is a faux packet type (element 113). The measurement host inserts in a port number field in the IPMP packet a faux port number, inserts in a first predetermined field in the IPMP packet an actual packet type, and inserts in a second predetermined field in the IPMP packet an actual port number (element 114). Finally, the measurement host encapsulates the IPMP packet in an IP datagram and a predetermined link layer protocol and sends the IPMP packet into the network from the measurement host (element 115).

References, which are hereby incorporated by reference herein:

[1] Braden, R., and J. Postel, "Requirements for Internet Gateways," STD 4, RFC 1009, USC/Information Sciences Institute, June 1987.

[2] Mills, D., "Network Time Protocol (Version 3), Specification, Implementation and analysis," RFC 1305, March 1992.

[3] Mills, D. "Simple Network Time Protocol (SNTP) Version 4 for IPv4, IPv6 and OSI," RFC 2030, October 1996.

[4] Case, J., et al. "Protocol Operations for Version 2 of the Simple Network Management Protocol (SNMPv2)," RFC 1905, October 1996.

Although various embodiments are specifically illustrated and described herein, it will be appreciated that modifications and variations of the invention are covered by the above teachings and are within the purview of the appended claims without departing from the spirit and intended scope of the invention. For example, certain versions of Internet Protocols (e.g., IPMP) are used in the above descriptions, but subsequent versions, replacements, or other protocol performing the same methods and techniques are within the scope of the inventions herein. Furthermore, these examples should not be interpreted to limit the modifications and variations of the invention covered by the claims but are merely illustrative of possible variations.

What is claimed is:

1. A method for performing a measurement in a network comprising:
   creating an Internet Protocol Measurement Protocol (IPMP) packet by a measurement host;
   including in the IPMP packet instructions for a recipient of the IPMP packet, said instructions including a start recording instruction to a recipient indicating a predetermined number of hops from the measurement host that are required before the recipient should begin adding additional information when forwarding the IPMP packet;
   encapsulating the IPMP packet in an Internet Protocol (IP) datagram and a predetermined link layer protocol; and
   sending the IPMP packet into the network from the measurement host.

2. The method according to claim 1, further comprising including an instruction in said instructions indicating to the recipient to insert a time stamp if the predetermined number of hops has occurred.

3. The method according to claim 1, further comprising including an instruction in said instructions indicating to the recipient to insert a path record if the predetermined number of hops has occurred.

4. The method according to claim 1, wherein said recipient of the IPMP packet decrements a value of the predetermined number of hops before forwarding the IPMP packet.

5. A method for performing a measurement in a network comprising:
   creating an Internet Protocol Measurement Protocol (IPMP) packet by a measurement host; including in the IPMP packet in a predetermined field a start time to live value and a time to live value;
   encapsulating the IPMP packet in an Internet Protocol (IP) datagram and a predetermined link layer protocol; and
   sending the IPMP packet into the network from the measurement host.

6. The method according to claim 5, further comprising:
   decrementing the staff time to live value before forwarding the IPMP packet by each recipient; and decrementing the time to live value when the staff time to live value equals the time to live value.

7. The method according to claim 6, further comprising initiating one or more predetermined actions at one or more subsequent recipients of the IPMP packet when the start time to live value equals the time to live value.

8. The method according to claim 7, wherein the one or more predetermined actions include inserting a path record.

9. The method according to claim 7, wherein the one or more predetermined actions include inserting a time stamp.

10. The method according to claim 7, wherein the one or more predetermined actions include inserting information requested in the IPMP packet instructions.

11. An apparatus for performing a measurement in a network comprising:
    a processor disposed in a measurement host;
    a memory coupled to the processor to store computer readable instructions causing the processor to:
    create an Internet Protocol Measurement Protocol (IPMP) packet;
    include in the IPMP packet instructions for a recipient of the IPMP packet, said instructions including a start recording instruction to the recipient indicating a predetermined number of hops from the measurement host that are required before a recipient should begin adding additional information when forwarding the IPMP packet;
    encapsulate the IPMP packet in an Internet Protocol (IP) datagram and a predetermined link layer protocol; and
    send the IPMP packet into the network.

12. The apparatus according to claim 11, wherein the processor includes an instruction in said instructions indicating to the recipient to insert a time stamp if the predetermined number of hops has occurred.

13. The apparatus according to claim 11, wherein the processor includes an instruction in said instructions indicating to recipient to insert a path record if the predetermined number of hops has occurred.

14. The apparatus according to claim 11, further comprising a recipient processor disposed in a recipient device that receives said IPMP packet, wherein said recipient processor decrements a value of the predetermined number of hops before forwarding the IPMP packet.

15. An apparatus for performing a measurement in a network comprising:
    a processor disposed in a measurement host;
    a memory coupled to the processor to store computer readable instructions causing the processor to: create an Internet Protocol Measurement Protocol (IPMP) packet;
    include in the IPMP packet in a predetermined field a start time to live value and a time to live value;
    encapsulate the IPMP packet in an Internet Protocol (IP) datagram and a predetermined link layer protocol; and
    send the IPMP packet into the network.

16. The apparatus according to claim 15, further comprising a recipient processor disposed in a recipient device, said recipient processor: decrementing the start time to live value before forwarding the IPMP packet: and decrementing the time to live value when the start time to live value equals the time to live value.

17. The apparatus according to claim 16, further comprising a recipient processor disposed in each recipient device to initiate one or more predetermined actions at one or more subsequent recipients of the IPMP packet when the start time to live value equals the time to live value.

18. The apparatus according to claim 17, wherein the one or more predetermined actions include inserting a path record.

19. The apparatus according to claim 17, wherein the one or more predetermined actions include inserting a time stamp.

20. The apparatus according to claim 17, wherein the one or more predetermined actions include inserting information requested in the IPMP packet instructions.

* * * * *

UNITED STATES PATENT AND TRADEMARK OFFICE
CERTIFICATE OF CORRECTION

| | | |
|---|---|---|
| PATENT NO. | : 7,336,620 B2 | Page 1 of 1 |
| APPLICATION NO. | : 10/648690 | |
| DATED | : February 26, 2008 | |
| INVENTOR(S) | : Bennett | |

It is certified that error appears in the above-identified patent and that said Letters Patent is hereby corrected as shown below:

In Column 5, Line 26, please delete "modem" and insert --modern--

In Column 12, Line 58, please delete "1" and insert --0--

In Column 16, Line 56, please delete "TL" and insert --TTL--

In Column 17, Line 9, please delete "Example" and insert --Example:--

In Column 18, Line 54, please delete "±/-2" and insert --+/-2--

In Column 18, Line 63, please delete "IS" and insert --is--

In Column 18, Line 66, please delete "(±/-" and insert --(+/- --

In Column 23, Line 11, please delete "MAX--TIME," and insert --MAX_TIME,--

In Column 32, Line 7, in Claim 6, please delete "staff" and insert --start--

In Column 32, Line 9, in Claim 6, please delete "staff" and insert --start--

In Columns 19-20, under "Info Flags", Line 8, please delete "than" and insert --then--

In Column 24, Line 67, please delete "33" and insert --33)--

Signed and Sealed this

Fifteenth Day of September, 2009

David J. Kappos
*Director of the United States Patent and Trademark Office*